US010755261B2

(12) United States Patent
Harper

(10) Patent No.: US 10,755,261 B2
(45) Date of Patent: Aug. 25, 2020

(54) PREPAID CARD WITH SAVINGS FEATURE

(75) Inventor: Kellie D. Harper, Alpine, UT (US)

(73) Assignee: BLACKHAWK NETWORK, INC., Pleasanton, CA (US)

(*) Notice: Subject to any disclaimer, the term of this patent is extended or adjusted under 35 U.S.C. 154(b) by 722 days.

(21) Appl. No.: 13/819,469

(22) PCT Filed: Aug. 26, 2011

(86) PCT No.: PCT/US2011/049338
§ 371 (c)(1),
(2), (4) Date: Jul. 1, 2013

(87) PCT Pub. No.: WO2012/027664
PCT Pub. Date: Mar. 1, 2012

(65) Prior Publication Data
US 2015/0302394 A1 Oct. 22, 2015

Related U.S. Application Data

(60) Provisional application No. 61/377,800, filed on Aug. 27, 2010.

(51) Int. Cl.
G06Q 40/04 (2012.01)
G06Q 20/34 (2012.01)
(Continued)

(52) U.S. Cl.
CPC ............ G06Q 20/34 (2013.01); G06Q 20/10 (2013.01); G06Q 20/28 (2013.01); G06Q 20/349 (2013.01);
(Continued)

(58) Field of Classification Search
None
See application file for complete search history.

(56) References Cited

U.S. PATENT DOCUMENTS 4,359,631 A   11/1982  Lockwood et al.
4,567,359 A   1/1986   Lockwood
(Continued)

FOREIGN PATENT DOCUMENTS

DE   4017264 A1   12/1991
EP   0863537 A1   9/1998
(Continued)

OTHER PUBLICATIONS

Cover sheet and specification for provisional patent application entitled "System and Method for Electronic Prepaid Account Replenishment," by Miles Paschini, et al., filed May 28, 2003 as U.S. Appl. No. 60/473,685.
(Continued)

Primary Examiner — William J Jacob
(74) Attorney, Agent, or Firm — Wick Phillips Gould & Martin LLP; Jerry C. Harris, Jr.

(57) ABSTRACT

A financial account system includes a stored-value card, a first financial account directly accessible via the stored-value card and a second financial account associated with the first financial account. Funds may be transferred between the first and the second financial account. The transfers between the first and the second financial account may be automatic, recurring, or one-time events and wherein the automatic, recurring, or one-time events may be transacted regardless of a current balance of the first financial account and/or the second financial account. The balances associated with the first and/or the second financial accounts may be used to collateralize loans.

21 Claims, 12 Drawing Sheets

(51) Int. Cl.
  *G06Q 40/02*  (2012.01)
  *G06Q 20/28*  (2012.01)
  *G06Q 30/02*  (2012.01)
  *G06Q 20/10*  (2012.01)

(52) U.S. Cl.
  CPC ..... *G06Q 20/3572* (2013.01); *G06Q 30/0207* (2013.01); *G06Q 40/02* (2013.01); *G06Q 40/025* (2013.01)

(56) References Cited

U.S. PATENT DOCUMENTS

| | | |
|---|---|---|
| RE32,115 E | 4/1986 | Lockwood et al. |
| 4,694,397 A | 9/1987 | Grant et al. |
| 4,951,196 A | 8/1990 | Jackson |
| 5,220,501 A | 6/1993 | Lawlor et al. |
| 5,291,017 A | 3/1994 | Wang et al. |
| 5,309,355 A | 5/1994 | Lockwood |
| 5,334,823 A | 8/1994 | Noblett et al. |
| 5,350,906 A | 9/1994 | Brody et al. |
| 5,468,958 A | 11/1995 | Franzen et al. |
| 5,477,038 A | 12/1995 | Levine et al. |
| 5,500,514 A | 3/1996 | Veeneman et al. |
| 5,534,683 A | 7/1996 | Rankl et al. |
| 5,557,516 A | 9/1996 | Hogan |
| 5,569,917 A | 10/1996 | Buttrill, Jr. et al. |
| 5,576,951 A | 11/1996 | Lockwood |
| 5,577,100 A | 11/1996 | McGregor et al. |
| 5,577,109 A | 11/1996 | Stimson et al. |
| 5,578,808 A | 11/1996 | Taylor |
| 5,621,787 A | 4/1997 | McKoy et al. |
| 5,645,434 A | 7/1997 | Leung |
| 5,650,604 A | 7/1997 | Marcous et al. |
| 5,689,100 A | 11/1997 | Carrithers et al. |
| 5,693,941 A | 12/1997 | Barlow et al. |
| 5,696,908 A | 12/1997 | Muehlberger et al. |
| 5,701,301 A | 12/1997 | Weisser, Jr. |
| 5,714,755 A | 2/1998 | Wells et al. |
| 5,722,067 A | 2/1998 | Fougnies et al. |
| 5,744,787 A | 4/1998 | Teicher |
| 5,748,737 A | 5/1998 | Daggar |
| 5,763,878 A | 6/1998 | Franzen |
| 5,778,313 A | 7/1998 | Fougnies |
| 5,796,832 A | 8/1998 | Kawan |
| 5,812,773 A | 9/1998 | Norin |
| 5,815,657 A | 9/1998 | Williams et al. |
| 5,826,185 A | 10/1998 | Wise et al. |
| 5,828,740 A | 10/1998 | Khuc et al. |
| 5,845,259 A | 12/1998 | West et al. |
| 5,854,975 A | 12/1998 | Fougnies et al. |
| 5,868,236 A | 2/1999 | Rademacher |
| 5,884,292 A | 3/1999 | Baker et al. |
| 5,892,827 A | 4/1999 | Beach et al. |
| 5,897,625 A | 4/1999 | Gustin et al. |
| 5,903,633 A | 5/1999 | Lorsch |
| 5,912,839 A * | 6/1999 | Ovshinsky .......... G11C 11/5678 257/E27.004 |
| 5,915,007 A | 6/1999 | Klapka |
| 5,920,847 A | 7/1999 | Kolling et al. |
| 5,937,396 A | 8/1999 | Konya |
| 5,943,424 A | 8/1999 | Berger et al. |
| 5,945,653 A | 8/1999 | Walker et al. |
| 5,953,398 A | 9/1999 | Hill |
| 5,969,318 A | 10/1999 | Mackenthun |
| 5,984,180 A | 11/1999 | Albrecht |
| 5,987,438 A | 11/1999 | Nakano et al. |
| 5,991,380 A | 11/1999 | Bruno et al. |
| 5,991,381 A | 11/1999 | Bouanaka et al. |
| 5,991,413 A | 11/1999 | Arditti et al. |
| 5,991,749 A | 11/1999 | Morrill, Jr. |
| 5,991,809 A | 11/1999 | Kriegsman |
| 6,000,608 A | 12/1999 | Dorf |
| 6,012,048 A | 1/2000 | Gustin et al. |
| 6,035,025 A | 3/2000 | Hanson |
| 6,044,360 A | 3/2000 | Picciallo |
| 6,049,774 A | 4/2000 | Roy |
| 6,058,300 A | 5/2000 | Hanson |
| 6,064,990 A | 5/2000 | Goldsmith |
| 6,081,791 A | 6/2000 | Clark |
| 6,081,840 A | 6/2000 | Zhao |
| 6,157,823 A | 12/2000 | Fougnies et al. |
| 6,169,975 B1 | 1/2001 | White et al. |
| 6,182,138 B1 | 1/2001 | Aoki |
| 6,185,545 B1 | 2/2001 | Resnick et al. |
| 6,188,752 B1 | 2/2001 | Lesley |
| 6,191,699 B1 | 2/2001 | Sawada |
| 6,209,032 B1 | 3/2001 | Dutcher et al. |
| 6,264,104 B1 | 7/2001 | Jenkins et al. |
| 6,269,343 B1 | 7/2001 | Pallakoff |
| 6,289,319 B1 | 9/2001 | Lockwood |
| 6,289,320 B1 | 9/2001 | Drummond et al. |
| 6,294,780 B1 | 9/2001 | Wells et al. |
| 6,299,062 B1 | 10/2001 | Hwang |
| 6,315,195 B1 | 11/2001 | Ramachandran |
| 6,317,754 B1 | 11/2001 | Peng |
| 6,320,947 B1 | 11/2001 | Joyce et al. |
| 6,323,980 B1 * | 11/2001 | Bloom ............... H04B 10/1125 398/116 |
| 6,327,363 B1 | 12/2001 | Henderson et al. |
| 6,330,978 B1 | 12/2001 | Molano et al. |
| 6,386,457 B1 | 5/2002 | Sorie |
| 6,453,162 B1 | 9/2002 | Gentry |
| 6,467,684 B2 | 10/2002 | Fite et al. |
| 6,502,191 B1 | 12/2002 | Smith et al. |
| 6,510,983 B2 | 1/2003 | Horowitz et al. |
| 6,526,130 B1 | 2/2003 | Paschini |
| 6,526,275 B1 | 2/2003 | Calvert |
| 6,574,617 B1 | 6/2003 | Immerman et al. |
| 6,581,827 B2 | 6/2003 | Welton |
| 6,596,990 B2 | 7/2003 | Kasten et al. |
| 6,615,189 B1 | 9/2003 | Phillips et al. |
| 6,628,766 B1 | 9/2003 | Hollis et al. |
| 6,651,885 B1 | 11/2003 | Arias |
| 6,742,023 B1 | 5/2004 | Fanning et al. |
| 6,759,899 B2 | 7/2004 | Lennartson et al. |
| 6,827,260 B2 | 12/2004 | Stoutenburg et al. |
| 6,829,596 B1 | 12/2004 | Frazee |
| 6,842,749 B2 | 1/2005 | Zara et al. |
| 6,910,053 B1 | 6/2005 | Pauly et al. |
| 6,934,529 B2 | 8/2005 | Bagoren et al. |
| 6,941,285 B2 | 9/2005 | Sarcanin |
| 6,965,667 B2 | 11/2005 | Trabandt et al. |
| 6,973,172 B1 | 12/2005 | Bitove et al. |
| 6,999,943 B1 | 2/2006 | Johnson et al. |
| 7,003,499 B2 | 2/2006 | Arditti et al. |
| 7,006,993 B1 | 2/2006 | Cheong et al. |
| 7,014,108 B2 | 3/2006 | Sorenson et al. |
| 7,031,693 B2 | 4/2006 | Öhrström et al. |
| 7,069,251 B1 | 6/2006 | Bartz et al. |
| 7,083,084 B2 | 8/2006 | Graves et al. |
| 7,089,209 B1 | 8/2006 | Kolls |
| 7,092,916 B2 | 8/2006 | Diveley et al. |
| 7,093,761 B2 | 8/2006 | Smith et al. |
| 7,103,575 B1 | 9/2006 | Linehan |
| 7,106,843 B1 | 9/2006 | Gainsboro et al. |
| 7,118,030 B2 | 10/2006 | Phillips et al. |
| 7,127,426 B2 | 10/2006 | Coyle |
| 7,131,578 B2 | 11/2006 | Paschini et al. |
| 7,131,582 B2 | 11/2006 | Welton |
| 7,181,416 B2 | 2/2007 | Arias |
| 7,191,939 B2 | 3/2007 | Beck et al. |
| 7,197,662 B2 | 3/2007 | Bullen et al. |
| 7,206,769 B2 | 4/2007 | Laurent et al. |
| 7,209,890 B1 | 4/2007 | Peon et al. |
| 7,210,620 B2 | 5/2007 | Jones |
| 7,210,624 B1 | 5/2007 | Birjandi et al. |
| 7,212,976 B2 | 5/2007 | Scheer |
| 7,216,091 B1 | 5/2007 | Blandina et al. |
| 7,248,855 B2 | 7/2007 | Joyce et al. |
| 7,255,268 B2 | 8/2007 | Dentlinger |
| 7,260,557 B2 | 8/2007 | Chavez |
| 7,268,901 B2 | 9/2007 | Brewster et al. |
| 7,280,644 B2 | 10/2007 | Tamari et al. |
| 7,280,645 B1 | 10/2007 | Allen et al. |

(56) References Cited

U.S. PATENT DOCUMENTS

| | | |
|---|---|---|
| 7,308,087 B2 | 12/2007 | Joyce et al. |
| 7,325,722 B2 | 2/2008 | Hosnedl et al. |
| 7,333,955 B2 | 2/2008 | Graves et al. |
| 7,363,265 B2 | 4/2008 | Horgan |
| 7,401,049 B2 | 7/2008 | Hobbs et al. |
| 7,404,011 B2 | 7/2008 | Hansmann et al. |
| 7,413,117 B2 | 8/2008 | Caven et al. |
| 7,433,212 B2 | 10/2008 | Igarashi et al. |
| 7,440,922 B1 | 10/2008 | Kempkes et al. |
| 7,454,200 B2 | 11/2008 | Cai et al. |
| 7,477,731 B2 | 1/2009 | Tamari et al. |
| 7,483,858 B2 | 1/2009 | Foran et al. |
| 7,522,716 B2 | 4/2009 | Paschini |
| 7,529,563 B1 | 5/2009 | Pitroda |
| 7,562,051 B1 | 7/2009 | Donner |
| 7,574,376 B1 | 8/2009 | Berman et al. |
| 7,577,613 B2 | 8/2009 | Tramontano et al. |
| 7,578,439 B2 | 8/2009 | Graves et al. |
| 7,580,859 B2 | 8/2009 | Economy et al. |
| 7,580,892 B1 | 8/2009 | Blosser et al. |
| 7,581,674 B2 * | 9/2009 | Cohen ............... G06Q 20/04 235/379 |
| 7,594,855 B2 | 9/2009 | Meyerhofer |
| 7,603,316 B1 | 10/2009 | Fife et al. |
| 7,607,574 B2 | 10/2009 | Kingsborough et al. |
| 7,613,284 B2 | 11/2009 | New |
| 7,614,549 B2 | 11/2009 | Hogg et al. |
| 7,617,152 B2 | 11/2009 | Chai et al. |
| 7,630,926 B2 | 12/2009 | Chakiris et al. |
| 7,647,627 B2 | 1/2010 | Maida-Smith et al. |
| 7,669,758 B2 | 3/2010 | Erikson |
| 7,676,030 B2 | 3/2010 | New et al. |
| 7,698,231 B2 | 4/2010 | Clinesmith et al. |
| 7,707,113 B1 | 4/2010 | DiMartino et al. |
| 7,739,162 B1 | 6/2010 | Pettay et al. |
| 7,740,170 B2 | 6/2010 | Singh et al. |
| 7,797,233 B2 | 9/2010 | Sobek |
| 7,813,822 B1 | 10/2010 | Hoffberg |
| 7,822,640 B2 | 10/2010 | Arthur et al. |
| 7,865,432 B2 | 1/2011 | Doran et al. |
| 7,890,422 B1 | 2/2011 | Hirka et al. |
| 7,891,563 B2 | 2/2011 | Oder, II et al. |
| 7,909,242 B2 | 3/2011 | Paschini et al. |
| 7,922,082 B2 | 4/2011 | Muscato |
| 7,925,531 B1 | 4/2011 | Cunningham et al. |
| 7,945,238 B2 | 5/2011 | Baker et al. |
| 7,945,512 B2 | 5/2011 | Scipioni et al. |
| 7,966,496 B2 | 6/2011 | Ellmore |
| 7,991,694 B2 | 8/2011 | Takayama |
| 8,020,754 B2 | 9/2011 | Schwarz, Jr. |
| 8,041,338 B2 | 10/2011 | Chen et al. |
| 8,041,642 B2 | 10/2011 | Lenard et al. |
| 8,060,413 B2 | 11/2011 | Castell et al. |
| 8,086,530 B2 | 12/2011 | Resnick et al. |
| 8,090,792 B2 | 1/2012 | Dubnicki et al. |
| 8,095,113 B2 | 1/2012 | Kean et al. |
| 8,109,436 B1 * | 2/2012 | Hopkins, III ........ G06Q 20/105 235/375 |
| 8,135,640 B2 | 3/2012 | Bayne |
| 8,195,565 B2 | 6/2012 | Bishop et al. |
| 8,245,910 B2 | 8/2012 | Sullivan et al. |
| 8,271,343 B2 | 9/2012 | Schorr et al. |
| 8,297,498 B2 | 10/2012 | Vriheas et al. |
| 8,306,912 B2 | 11/2012 | Galit |
| 8,321,270 B2 | 11/2012 | Antonucci |
| 8,341,045 B2 | 12/2012 | Kravitz et al. |
| 8,355,982 B2 | 1/2013 | Hazel et al. |
| 8,359,239 B1 | 1/2013 | Cook et al. |
| 8,371,502 B1 | 2/2013 | Galit et al. |
| 8,452,880 B2 | 5/2013 | Jain |
| 8,458,016 B1 | 6/2013 | Medina, III et al. |
| 8,472,594 B2 | 6/2013 | New et al. |
| 8,479,980 B2 | 7/2013 | Paschini et al. |
| 8,523,054 B2 | 9/2013 | Yankovich et al. |
| 8,583,520 B1 * | 11/2013 | Forbes, Jr. ............. G05D 17/00 705/34 |
| 8,626,617 B1 | 1/2014 | Bhatt |
| 8,682,715 B1 | 3/2014 | Cedeno |
| 8,762,236 B1 | 6/2014 | Shirey et al. |
| 8,768,817 B2 | 7/2014 | Takeo et al. |
| 9,031,880 B2 | 5/2015 | Bishop et al. |
| 9,542,553 B1 | 1/2017 | Burger et al. |
| 9,558,484 B2 | 1/2017 | Paschini et al. |
| 9,805,314 B2 * | 10/2017 | Pechanec ............. G06Q 10/103 |
| 9,852,414 B2 | 12/2017 | Llach |
| 2001/0021927 A1 | 9/2001 | Laurent et al. |
| 2001/0027446 A1 | 10/2001 | Metcalfe |
| 2001/0037291 A1 | 11/2001 | Allen, II |
| 2001/0039535 A1 | 11/2001 | Tsiounis et al. |
| 2001/0042784 A1 | 11/2001 | Fite et al. |
| 2002/0010659 A1 | 1/2002 | Cruse et al. |
| 2002/0046122 A1 | 4/2002 | Barber et al. |
| 2002/0059114 A1 | 5/2002 | Cockrill et al. |
| 2002/0077973 A1 | 6/2002 | Ronchi et al. |
| 2002/0099667 A1 | 7/2002 | Diamandis et al. |
| 2002/0116280 A1 | 8/2002 | Boies et al. |
| 2002/0128938 A1 | 9/2002 | Schofield et al. |
| 2002/0152124 A1 | 10/2002 | Guzman et al. |
| 2002/0152175 A1 | 10/2002 | Armstrong et al. |
| 2002/0156696 A1 | 10/2002 | Teicher |
| 2002/0161650 A1 | 10/2002 | Buchanan et al. |
| 2002/0165820 A1 | 11/2002 | Anvekar et al. |
| 2002/0169648 A1 | 11/2002 | Zara et al. |
| 2002/0174034 A1 | 11/2002 | Au et al. |
| 2002/0181600 A1 | 12/2002 | Matsuura et al. |
| 2003/0028481 A1 | 2/2003 | Flitcroft |
| 2003/0046231 A1 | 3/2003 | Wu |
| 2003/0046249 A1 | 3/2003 | Wu |
| 2003/0050041 A1 | 3/2003 | Wu |
| 2003/0083946 A1 | 5/2003 | Nishiyama |
| 2003/0110104 A1 | 6/2003 | King et al. |
| 2003/0126075 A1 | 7/2003 | Mascavage, III et al. |
| 2003/0144910 A1 | 7/2003 | Flaherty et al. |
| 2003/0177028 A1 | 9/2003 | Cooper et al. |
| 2003/0191945 A1 | 10/2003 | Keech |
| 2003/0200179 A1 | 10/2003 | Kwan |
| 2003/0200465 A1 | 10/2003 | Bhat et al. |
| 2003/0212595 A1 | 11/2003 | Antonucci |
| 2003/0236755 A1 | 12/2003 | Dagelet, Jr. |
| 2004/0011866 A1 | 1/2004 | Saad |
| 2004/0019571 A1 | 1/2004 | Hurwitz et al. |
| 2004/0049598 A1 | 3/2004 | Tucker et al. |
| 2004/0078332 A1 | 4/2004 | Ferguson et al. |
| 2004/0086098 A1 | 5/2004 | Craft |
| 2004/0088250 A1 | 5/2004 | Bartter et al. |
| 2004/0128508 A1 | 7/2004 | Wheeler et al. |
| 2004/0133511 A1 | 7/2004 | Smith et al. |
| 2004/0153410 A1 | 8/2004 | Nootebos et al. |
| 2004/0185827 A1 | 9/2004 | Parks |
| 2004/0205023 A1 | 10/2004 | Hafer et al. |
| 2004/0210489 A1 | 10/2004 | Jackson et al. |
| 2004/0215560 A1 | 10/2004 | Amalraj et al. |
| 2004/0230489 A1 | 11/2004 | Goldthwaite et al. |
| 2004/0254891 A1 | 12/2004 | Blinn et al. |
| 2005/0008132 A1 | 1/2005 | Paschini et al. |
| 2005/0010452 A1 | 1/2005 | Lusen |
| 2005/0018824 A1 | 1/2005 | Richardson |
| 2005/0027655 A1 | 2/2005 | Sharma et al. |
| 2005/0038714 A1 | 2/2005 | Bonet et al. |
| 2005/0038718 A1 | 2/2005 | Barnes et al. |
| 2005/0086168 A1 * | 4/2005 | Alvarez ............... G06Q 20/027 705/41 |
| 2005/0192893 A1 | 9/2005 | Keeling et al. |
| 2005/0229003 A1 | 10/2005 | Paschini et al. |
| 2005/0234822 A1 | 10/2005 | VanFleet et al. |
| 2006/0026073 A1 | 2/2006 | Kenny, Jr. et al. |
| 2006/0043171 A1 | 3/2006 | New et al. |
| 2006/0045244 A1 | 3/2006 | New |
| 2006/0064344 A1 | 3/2006 | Lidow |
| 2006/0074783 A1 | 4/2006 | Agarwal et al. |
| 2006/0074799 A1 | 4/2006 | Averyt et al. |
| 2006/0078100 A1 | 4/2006 | Risafi et al. |
| 2006/0129419 A1 | 6/2006 | Flaxer et al. |

(56) References Cited

U.S. PATENT DOCUMENTS

| | | |
|---|---|---|
| 2006/0184613 A1 | 8/2006 | Stienessen et al. |
| 2006/0202012 A1 | 9/2006 | Grano et al. |
| 2006/0242087 A1 | 10/2006 | Naehr et al. |
| 2006/0248017 A1 | 11/2006 | Koka et al. |
| 2006/0253335 A1 | 11/2006 | Keena et al. |
| 2006/0269722 A1 | 11/2006 | Yamada |
| 2007/0023504 A1* | 2/2007 | Blankenship .......... G06Q 20/40 |
| | | 235/380 |
| 2007/0073586 A1 | 3/2007 | Dev et al. |
| 2007/0090183 A1 | 4/2007 | Hursta et al. |
| 2007/0101351 A1 | 5/2007 | Bagsby et al. |
| 2007/0125838 A1 | 6/2007 | Law et al. |
| 2007/0125840 A1 | 6/2007 | Law et al. |
| 2007/0198437 A1 | 8/2007 | Eisner et al. |
| 2007/0210152 A1 | 9/2007 | Read |
| 2007/0255662 A1 | 11/2007 | Tumminaro |
| 2007/0272743 A1 | 11/2007 | Christie et al. |
| 2007/0276765 A1 | 11/2007 | Hazel et al. |
| 2007/0293309 A1 | 12/2007 | Jorasch et al. |
| 2008/0040284 A1 | 2/2008 | Hazel et al. |
| 2008/0059302 A1 | 3/2008 | Fordyce, III et al. |
| 2008/0059379 A1 | 3/2008 | Ramaci et al. |
| 2008/0078831 A1 | 4/2008 | Johnson et al. |
| 2008/0099551 A1 | 5/2008 | Harper et al. |
| 2008/0114696 A1* | 5/2008 | Singh .................... G06Q 20/20 |
| | | 705/66 |
| 2008/0147546 A1 | 6/2008 | Weichselbaumer et al. |
| 2008/0147552 A1 | 6/2008 | Morsillo et al. |
| 2008/0162360 A1 | 7/2008 | Bantz et al. |
| 2008/0169344 A1* | 7/2008 | Huh ...................... G06Q 20/10 |
| | | 235/380 |
| 2008/0177655 A1 | 7/2008 | Zalik |
| 2008/0189214 A1 | 8/2008 | Mueller et al. |
| 2008/0195499 A1 | 8/2008 | Meredith et al. |
| 2008/0208748 A1 | 8/2008 | Ozment et al. |
| 2008/0222417 A1 | 9/2008 | Downes et al. |
| 2008/0223920 A9 | 9/2008 | Duke |
| 2008/0228637 A1* | 9/2008 | Scipioni ................ G06Q 20/04 |
| | | 705/39 |
| 2008/0255992 A1 | 10/2008 | Lin |
| 2008/0270246 A1 | 10/2008 | Chen |
| 2008/0270253 A1 | 10/2008 | Huang |
| 2008/0288405 A1 | 11/2008 | John |
| 2008/0319914 A1 | 12/2008 | Carrott |
| 2009/0030836 A1 | 1/2009 | Blandina et al. |
| 2009/0031407 A1 | 1/2009 | Kuang et al. |
| 2009/0037326 A1 | 2/2009 | Chitti et al. |
| 2009/0037333 A1 | 2/2009 | Flitcroft et al. |
| 2009/0048953 A1 | 2/2009 | Hazel et al. |
| 2009/0048963 A1 | 2/2009 | Bishop et al. |
| 2009/0050688 A1 | 2/2009 | Kon et al. |
| 2009/0063420 A1* | 3/2009 | Surtani ............... G06F 11/1666 |
| 2009/0084842 A1* | 4/2009 | Vriheas ................ G06Q 20/28 |
| | | 235/380 |
| 2009/0106160 A1 | 4/2009 | Skowronek |
| 2009/0119190 A1 | 5/2009 | Realini |
| 2009/0164320 A1 | 6/2009 | Galit |
| 2009/0177563 A1 | 7/2009 | Bernstein et al. |
| 2009/0234751 A1 | 9/2009 | Chan et al. |
| 2009/0254441 A1 | 10/2009 | Ahlers et al. |
| 2009/0288012 A1 | 11/2009 | Hertel et al. |
| 2009/0299841 A1 | 12/2009 | Bishop et al. |
| 2009/0319348 A1 | 12/2009 | Khosravy et al. |
| 2009/0319784 A1 | 12/2009 | Faith et al. |
| 2009/0327067 A1 | 12/2009 | Berger et al. |
| 2010/0036743 A1 | 2/2010 | Tamari et al. |
| 2010/0043008 A1 | 2/2010 | Marchand |
| 2010/0057580 A1 | 3/2010 | Raghunathan |
| 2010/0076877 A1 | 3/2010 | Lenahan et al. |
| 2010/0094674 A1 | 4/2010 | Marriner et al. |
| 2010/0114731 A1 | 5/2010 | Kingston et al. |
| 2010/0114773 A1 | 5/2010 | Skowronek |
| 2010/0125510 A1 | 5/2010 | Smith et al. |
| 2010/0154027 A1 | 6/2010 | Sobel et al. |
| 2010/0200652 A1 | 8/2010 | Wolfe et al. |
| 2010/0260388 A1 | 10/2010 | Garrett et al. |
| 2010/0268645 A1 | 10/2010 | Martino et al. |
| 2010/0293093 A1 | 11/2010 | Karpenko |
| 2010/0299194 A1 | 11/2010 | Snyder et al. |
| 2010/0299195 A1 | 11/2010 | Nix et al. |
| 2010/0299221 A1 | 11/2010 | Paschini et al. |
| 2010/0299733 A1 | 11/2010 | Paschini et al. |
| 2010/0325006 A1 | 12/2010 | White |
| 2011/0035446 A1 | 2/2011 | Goermer et al. |
| 2011/0041006 A1 | 2/2011 | Fowler |
| 2011/0068170 A1 | 3/2011 | Lehman |
| 2011/0099055 A1 | 4/2011 | Khalil |
| 2011/0101093 A1 | 5/2011 | Ehrensvärd |
| 2011/0125645 A1 | 5/2011 | Benkert et al. |
| 2011/0131275 A1 | 6/2011 | Maida-Smith et al. |
| 2011/0161229 A1 | 6/2011 | Mastrangelo et al. |
| 2011/0208656 A1 | 8/2011 | Alba et al. |
| 2011/0218911 A1 | 9/2011 | Spodak |
| 2011/0226620 A1 | 9/2011 | Tadayoni-Rebek et al. |
| 2011/0231272 A1 | 9/2011 | Englund et al. |
| 2011/0302646 A1 | 12/2011 | Ronda et al. |
| 2011/0307377 A1 | 12/2011 | Nelsen et al. |
| 2012/0054111 A1* | 3/2012 | Pechanec ............ G06Q 10/103 |
| | | 705/301 |
| 2012/0150553 A1 | 6/2012 | Wade |
| 2012/0221468 A1 | 8/2012 | Kumnick et al. |
| 2012/0259718 A1 | 10/2012 | Miller et al. |
| 2012/0265681 A1 | 10/2012 | Ross |
| 2012/0317028 A1 | 12/2012 | Ansari |
| 2013/0010941 A1 | 1/2013 | New et al. |
| 2013/0013510 A1 | 1/2013 | Ansari |
| 2013/0018783 A1 | 1/2013 | Ansari |
| 2013/0018793 A1 | 1/2013 | Wong et al. |
| 2013/0030941 A1 | 1/2013 | Meredith et al. |
| 2013/0036019 A1 | 2/2013 | Tamari et al. |
| 2013/0036048 A1* | 2/2013 | Campos ................ G06Q 20/36 |
| | | 705/41 |
| 2013/0041768 A1 | 2/2013 | Llach |
| 2013/0054470 A1 | 2/2013 | Campos et al. |
| 2013/0066735 A1 | 3/2013 | Llach |
| 2013/0091060 A1 | 4/2013 | Kundu |
| 2013/0117138 A1 | 5/2013 | Hazel et al. |
| 2013/0185214 A1 | 7/2013 | Azen et al. |
| 2013/0191136 A1 | 7/2013 | Apshago et al. |
| 2013/0191213 A1 | 7/2013 | Beck et al. |
| 2013/0262316 A1 | 10/2013 | Hruska |
| 2013/0268437 A1 | 10/2013 | Desai et al. |
| 2013/0304642 A1 | 11/2013 | Campos |
| 2014/0019352 A1 | 1/2014 | Shrivastava |
| 2014/0025519 A1 | 1/2014 | Thomas |
| 2014/0143089 A1 | 5/2014 | Campos et al. |
| 2014/0214656 A1* | 7/2014 | Williams ............ G06Q 20/223 |
| | | 705/39 |
| 2015/0170128 A1 | 6/2015 | Paschini et al. |
| 2015/0302394 A1 | 10/2015 | Harper |
| 2015/0348018 A1 | 12/2015 | Campos et al. |
| 2017/0236117 A1 | 8/2017 | Paschini et al. |

FOREIGN PATENT DOCUMENTS

| | | |
|---|---|---|
| EP | 1286317 A2 | 2/2003 |
| EP | 1829352 A2 | 9/2007 |
| EP | 1829354 A2 | 9/2007 |
| EP | 2521999 A1 | 11/2012 |
| GB | 2215897 A | 9/1989 |
| GB | 2287565 A | 9/1995 |
| JP | 5225221 A | 9/1993 |
| JP | 10155040 A | 6/1998 |
| JP | 10174009 A | 6/1998 |
| JP | 11259576 A | 9/1999 |
| JP | 2003016368 A | 1/2003 |
| KR | 20020020773 A | 3/2002 |
| WO | 9641462 A1 | 12/1996 |
| WO | 9746961 A1 | 12/1997 |
| WO | 9847112 A1 | 10/1998 |
| WO | 0111857 A1 | 2/2001 |
| WO | 0116905 A1 | 3/2001 |
| WO | 03071386 A2 | 8/2003 |

(56) References Cited

FOREIGN PATENT DOCUMENTS

| WO | 03083792 A2 | 10/2003 |
|---|---|---|
| WO | 2004107280 A2 | 12/2004 |
| WO | 2004107280 A3 | 12/2004 |
| WO | 2006062832 A2 | 6/2006 |
| WO | 2006062832 A3 | 6/2006 |
| WO | 2006062842 A2 | 6/2006 |
| WO | 2006062842 A3 | 6/2006 |
| WO | 2007127729 A2 | 11/2007 |
| WO | 2008008671 A2 | 1/2008 |
| WO | 2011085241 A1 | 7/2011 |
| WO | 2011159571 A1 | 12/2011 |
| WO | 2011159579 A2 | 12/2011 |
| WO | 2011159579 A3 | 12/2011 |
| WO | 2012027664 A1 | 3/2012 |
| WO | 2012166790 A1 | 12/2012 |
| WO | 2013123438 A1 | 8/2013 |
| WO | 2014081822 A2 | 5/2014 |
| WO | 2014081822 A3 | 5/2014 |
| WO | 2014107594 A2 | 7/2014 |
| WO | 2014107594 A3 | 7/2014 |

OTHER PUBLICATIONS

Office Action dated May 9, 2014 (58 pages), U.S. Appl. No. 13/914,360, filed Jun. 10, 2013.
Foreign communication from a related counterpart application—Australian Examination Report, Application No. 2011203954, dated Nov. 28, 2014, 4 pages.
Foreign communication from a related counterpart application—Search Report, European Application No. 11732229.7, dated Dec. 8, 2014, 8 pages.
Foreign communication from a related counterpart application—Mexican Office Action, Application No. MX/a/2012/007926, dated Nov. 21, 2014, 10 pages.
Office Action dated Dec. 22, 2014 (31 pages), U.S. Appl. No. 12/538,083, filed Aug. 7, 2009.
Office Action dated Jan. 5, 2015 (72 pages), U.S. Appl. No. 14/452,829, filed Aug. 6, 2014.
Office Action (Final) dated Jan. 14, 2015 (38 pages), U.S. Appl. No. 13/704,084, filed Dec. 13, 2012.
Office Action (Final) dated Feb. 4, 2015 (16 pages), U.S. Appl. No. 13/619,226, filed Sep. 14, 2012.
Office Action (Final) dated Mar. 18, 2015 (18 pages), U.S. Appl. No. 12/538,083, filed Aug. 7, 2009.
Office Action dated Mar. 5, 2015 (43 pages), U.S. Appl. No. 13/621,331, filed Sep. 17, 2012.
Office Action dated Mar. 17, 2015 (80 pages), U.S. Appl. No. 13/483,711, filed May 30, 2012.
Advisory Action dated Jul. 9, 2015 (8 pages), U.S. Appl. No. 12/538,083, filed Aug. 7, 2009.
Office Action dated Jul. 15, 2015 (8 pages), U.S. Appl. No. 13/619,176, filed Sep. 14, 2012.
Foreign communication from a related counterpart application—International Preliminary Report on Patentability, PCT/US2012/039981, dated Dec. 2, 2013, 31 pages.
Foreign communication from a related counterpart application—Mexican Office Action, Application No. MX/a/2013/013903, dated Apr. 23, 2015, 9 pages.
Office Action (Final) dated Jun. 2, 2015 (33 pages), U.S. Appl. No. 13/520,849, filed Jul. 6, 2012.
Office Action (Final) dated Jun. 18, 2015 (32 pages), U.S. Appl. No. 13/617,751, filed Sep. 14, 2012.
Office Action (Final) dated Jun. 3, 2015 (32 pages), U.S. Appl. No. 10/821,815, filed Apr. 9, 2004.
Office Action dated Mar. 25, 2015 (9 pages), U.S. Appl. No. 12/711,211, filed Feb. 23, 2010.
Office Action (Final) dated Apr. 7, 2015 (23 pages), U.S. Appl. No. 12/538,083, filed Aug. 7, 2009.
Office Action (Final) dated May 6, 2015 (13 pages), U.S. Appl. No. 14/106,494, filed Dec. 13, 2013.
Advisory Action dated May 21, 2015 (6 pages), U.S. Appl. No. 13/621,331, filed Sep. 17, 2012.
Advisory Action dated Apr. 3, 2015 (3 pages), U.S. Appl. No. 13/704,084, filed Dec. 13, 2012.
Office Action dated Jun. 29, 2015 (37 pages), U.S. Appl. No. 13/704,084, filed Dec. 13, 2012.
Advisory Action dated Apr. 14, 2015 (3 pages), U.S. Appl. No. 13/619,226, filed Sep. 14, 2012.
Office Action (Final) dated Jun. 9, 2015 (26 pages), U.S. Appl. No. 14/085,394, filed Nov. 20, 2013.
Patent application entitled "System and Method of Registering Stored-Value Cards into Electronic Wallets," by Tomas Ariel Campos, et al., filed Aug. 15, 2014 as U.S. Appl. No. 14/379,210.
Foreign communication from a related counterpart application—International Preliminary Report on Patentability, PCT/US2011/039996, dated Dec. 14, 2012, 7 pages.
Foreign communication from a related counterpart application—International Search Report and Written Opinion, PCT/US2011/040055, dated Jan. 27, 2012, 12 pages.
Foreign communication from a related counterpart application—International Preliminary Report on Patentability, PCT/US2011/040055, dated Dec. 14, 2012, 8 pages.
Foreign communication from a related counterpart application—Invitation to Pay Additional Fees, PCT/US2011/040055, dated Nov. 16, 2011, 2 pages.
Foreign communication from a related counterpart application—International Search Report and Written Opinion, PCT/US2011/049338, dated Jan. 24, 2012, 7 pages.
Foreign communication from a related counterpart application—International Preliminary Report on Patentability, PCT/US2011/049338, dated Mar. 5, 2013, 6 pages.
Foreign communication from a related counterpart application—Invitation to Pay Additional Fees, PCT/US2013/026501, dated Apr. 16, 2013, 2 pages.
Foreign communication from a related counterpart application—Office Action, Mexican Patent Application No. MX/a/2007/006924, dated Jul. 28, 2010, 3 pages.
Gill, Lynn A., et al., "In Situ Optimization of the Electrode Geometry of the Quadrupole Ion Trap," International Journal of Mass Spectrometry, 1999, pp. 87-93, vol. 188, Elsevier Science B.V.
Gralla, Preston, "How the Internet Works," Millennium Edition, 1999, 35 pages, Que Corporation, A Division of Macmillan Computer Publishing, USA.
Harrop, Peter, "The Electronic Purse," IEE Review, Jun. 1992, pp. 227-231, IEE.
"Innovative Telecom Corp. and Catalina Marketing Corporation to Make Prepaid Long Distance Certificates Available to 120 Million Shoppers," Abstract, PR Newswire, Sep. 28, 1995, 3 pages, Section: Financial News, Ref. 4, Catalina Marketing, 1994-1997, Lexis/Nexis Database.
"Innovative Telecom Corporation Receives Contract from NYNEX to Provide Prepaid Phone Card Services," Abstract, PR Newswire, Sep. 28, 1995, 1 page, Section: Financial News, Ref. 4, Innovative Telecom, 1994-1997, Lexis/Nexis Database.
Knowles, Francine, "ATMs to Dispense Calling Cards; Ameritech, Cash Station in Venture," Abstract, Financial Section, Chicago Sun-Times, Oct. 18, 1995, 2 pages, Ref. 1, Ameritech & ATM, PINs, or Prepaid Cards, 1994-1997, Lexis/Nexis Database.
Kreyer, Nina, et al., "Standardized Payment Procedures as Key Enabling Factor for Mobile Commerce," Preceedings of the Third International Conference on E-Commerce and Web Technologies, 2002, pp. 400-409, Springer-Verlag Berlin Heidelberg.
Levy, Steven, "E-Money (That's What I Want)," Wired, 1994, 11 pages, © The Condé Nast Publications Inc., © Wired Digital, Inc.
Lilge, Manfred, "Evolution of Prepaid Service Towards a Real-Time Payment System," 2001, pp. 195-198, IEEE.
Lin, Yi-Bing, et al., "Mobile Prepaid Phone Services," IEEE Personal Communications, Jun. 2000, pp. 6-14, IEEE.
"Loose Change," Abstract, U.S. Banker, Sep. 1995, 1 page, National Edition, Section USB News, Industry, p. 12, Ref. 1, EDS (Electronic Data Systems), 1994-1997, Lexis/Nexis Database.

(56) References Cited

OTHER PUBLICATIONS

Marcous, Neil P., et al., Abstract, U.S. Pat. No. 5,650,604, Jul. 22, 1997, 1 page, Ref. 10, EDS (Electronic Data Systems), 1994-1997, Lexis/Nexis Database.

"Model 5008C Eight Selection Card Vending Machine," http://www.vendapin.com/5008.html, downloaded from Internet on May 9, 2013, 1 page.

Muller, Nathan J., "Desktop Encyclopedia of the Internet," 1999, 51 pages, Artech House Inc., Norwood, MA.

Office Action (Final) dated Nov. 23, 2009 (21 pages), U.S. Appl. No. 10/821,405, filed Apr. 9, 2004.

Office Action dated Jan. 14, 2009 (19 pages), U.S. Appl. No. 10/821,405, filed Apr. 9, 2004.

Advisory Action dated Apr. 12, 2013 (3 pages), U.S. Appl. No. 10/821,815, filed Apr. 9, 2004.

Advisory Action dated Apr. 19, 2012 (3 pages), U.S. Appl. No. 10/821,815, filed Apr. 9, 2004.

Advisory Action dated Apr. 28, 2009 (3 pages), U.S. Appl. No. 10/821,815, filed Apr. 9, 2004.

Office Action (Final) dated Jan. 25, 2013 (15 pages), U.S. Appl. No. 10/821,815, filed Apr. 9, 2004.

Office Action dated Jul. 16, 2012 (15 pages), U.S. Appl. No. 10/821,815, filed Apr. 9, 2004.

Office Action (Final) dated Feb. 1, 2012 (15 pages), U.S. Appl. No. 10/821,815, filed Apr. 9, 2004.

Office Action dated May 9, 2011 (12 pages), U.S. Appl. No. 10/821,815, filed Apr. 9, 2004.

Office Action dated Aug. 4, 2010 (14 pages), U.S. Appl. No. 10/821,815, filed Apr. 9, 2004.

Office Action dated Aug. 5, 2009 (11 pages), U.S. Appl. No. 10/821,815, filed Apr. 9, 2004.

Office Action (Final) dated Feb. 4, 2009 (9 pages), U.S. Appl. No. 10/821,815, filed Apr. 9, 2004.

Office Action dated May 14, 2008 (10 pages), U.S. Appl. No. 10/821,815, filed Apr. 9, 2004.

Advisory Action dated Apr. 11, 2013 (3 pages), U.S. Appl. No. 12/786,403, filed May 24, 2010.

Advisory Action dated May 8, 2012 (2 pages), U.S. Appl. No. 12/786,403, filed May 24, 2010.

Office Action (Final) dated Jan. 16, 2013 (15 pages), U.S. Appl. No. 12/786,403, filed May 24, 2010.

Office Action dated Jun. 6, 2012 (14 pages), U.S. Appl. No. 12/786,403, filed May 24, 2010.

Office Action (Final) dated Feb. 14, 2012 (13 pages), U.S. Appl. No. 12/786,403, filed May 24, 2010.

Office Action dated May 12, 2011 (15 pages), U.S. Appl. No. 12/786,403, filed May 24, 2010.

Advisory Action dated Jan. 8, 2013 (3 pages), U.S. Appl. No. 12/711,211, filed Feb. 23, 2010.

Advisory Action dated Feb. 15, 2012 (3 pages), U.S. Appl. No. 12/711,211, filed Feb. 23, 2010.

Office Action (Final) dated May 22, 2013 (12 pages), U.S. Appl. No. 12/711,211, filed Feb. 23, 2010.

Office Action (Final) dated Oct. 26, 2012 (11 pages), U.S. Appl. No. 12/711,211, filed Feb. 23, 2010.

Office Action dated Apr. 11, 2012 (11 pages), U.S. Appl. No. 12/711,211, filed Feb. 23, 2010.

Office Action (Final) dated Dec. 8, 2011 (12 pages), U.S. Appl. No. 12/711,211, filed Feb. 23, 2010.

Office Action dated Oct. 1, 2010 (10 pages), U.S. Appl. No. 12/711,211, filed Feb. 23, 2010.

Advisory Action dated Mar. 12, 2013 (3 pages), U.S. Appl. No. 12/538,083, filed Aug. 7, 2009.

Office Action dated Mar. 14, 2013 (9 pages), U.S. Appl. No. 13/619,425, filed Sep. 14, 2012.

Filing receipt and specification for patent application entitled "System for Payment via Electronic Wallet," by Tomas Campos, filed Aug. 6, 2014 as U.S. Appl. No. 14/452,829.

Filing receipt and specification for provisional patent application entitled "Endless Endcap," by Tomas Ariel Campos, filed Nov. 20, 2012 as U.S. Appl. No. 61/728,597.

Foreign communication from a related counterpart application—Australian Examination Report, Application No. 2011293250, dated Jun. 2, 2014, 3 pages.

Foreign communication from a related counterpart application—International Search Report and Written Opinion, PCT/US2014/010206, dated Jun. 23, 2014, 10 pages.

Foreign communication from a related counterpart application—International Preliminary Report on Patentability, PCT/US2013/026501, dated Aug. 19, 2014, 12 pages.

Foreign communication from a related counterpart application—International Search Report and Written Opinion, PCT/US2013/070991, dated May 22, 2014, 11 pages.

Notice of Allowance dated Jul. 2, 2014 (41 pages), U.S. Appl. No. 14/065,189, filed Oct. 28, 2013.

Office Action dated Jul. 15, 2014 (19 pages), U.S. Appl. No. 13/619,176, filed Sep. 14, 2012.

Office Action dated Jul. 31, 2014 (38 pages), U.S. Appl. No. 13/621,331, filed Sep. 17, 2012.

Office Action dated Aug. 6, 2014 (30 pages), U.S. Appl. No. 13/704,084, filed Dec. 13, 2012.

Foreign communication from a related counterpart application—Mexican Office Action, Application No. MX/a/2012/007926, dated Nov. 26, 2013, 14 pages.

Foreign communication from a related counterpart application—Mexican Office Action, Application No. MX/a/2012/007926, dated Apr. 25, 2014, 11 pages.

Office Action dated Sep. 26, 2014 (31 pages), U.S. Appl. No. 13/520,849, filed Jul. 6, 2012.

Office Action dated Oct. 1, 2014 (16 pages), U.S. Appl. No. 10/821,815, filed Apr. 9, 2004.

Office Action dated Sep. 9, 2014 (10 pages), U.S. Appl. No. 12/711,211, filed Feb. 23, 2010.

Office Action dated Sep. 15, 2014 (63 pages), U.S. Appl. No. 13/619,226, filed Sep. 14, 2012.

Foreign communication from a related counterpart application—International Search Report and Written Opinion, PCT/US2013/026501, dated Jun. 19, 2013, 15 pages.

Foreign communication from a related counterpart application—Examination Report, New Zealand Application No. 605666, dated Nov. 3, 2014, 4 pages.

Office Action dated Nov. 19, 2014 (27 pages), U.S. Appl. No. 13/617,751, filed Sep. 14, 2012.

Office Action dated Nov. 13, 2014 (12 pages), U.S. Appl. No. 12/786,403, filed May 24, 2010.

Notice of Allowance dated Oct. 24, 2014 (18 pages), U.S. Appl. No. 13/914,360, filed Jun. 10, 2013.

Office Action dated Dec. 4, 2014 (61 pages), U.S. Appl. No. 14/085,394, filed Nov. 20, 2013.

Office Action dated Dec. 5, 2014 (12 pages), U.S. Appl. No. 14/106,494, filed Dec. 13, 2013.

Foreign communication from a related counterpart application—Examination Report, New Zealand Application No. 605612, dated Nov. 18, 2014, 4 pages.

Foreign communication from a related counterpart application—Examination Report, Australian Application No. 2011268018, dated Nov. 24, 2014, 4 pages.

Foreign communication from a related counterpart application—Examination Report, Australian Application No. 2011268026, dted Nov. 26, 2014, 4 pages.

Office Action (Final) dated Dec. 28, 2012 (12 pages), U.S. Appl. No. 12/538,083, filed Aug. 7, 2009.

Office Action dated Apr. 9, 2012 (19 pages), U.S. Appl. No. 12/538,083, filed Aug. 7, 2009.

Office Action dated Jan. 16, 2013 (6 pages), U.S. Appl. No. 13/619,176, filed Sep. 14, 2012.

Advisory Action dated Jun. 6, 2013 (3 pages), U.S. Appl. No. 13/495,986, filed Jun. 13, 2012.

Office Action (Final) dated Mar. 25, 2013 (13 pages), U.S. Appl. No. 13/495,986, filed Jun. 13, 2012.

(56) References Cited

OTHER PUBLICATIONS

Office Action dated Dec. 11, 2012 (15 pages), U.S. Appl. No. 13/495,986, filed Jun. 13, 2012.
Advisory Action dated May 31, 2013 (3 pages), U.S. Appl. No. 13/619,226, filed Sep. 14, 2012.
Office Action (Final) dated Mar. 25, 2013 (13 pages), U.S. Appl. No. 13/619,226, filed Sep. 14, 2012.
Office Action dated Dec. 11, 2012 (15 pages), U.S. Appl. No. 13/619,226, filed Sep. 14, 2012.
"Outsourcing the ATM business," Abstract, Electronic Payments International No. 102, Nov. 1995, 1 page, Ref. 5, EDS (Electronic Data Systems), 1994-1997, Lexis/Nexis Database.
Panurach, Patiwat, "Money in Electronic Commerce: Digital Cash, Electronic Fund Transfer, and Ecash," Communications of the ACM, Jun. 1996, pp. 45-50, vol. 39, No. 6, ACM.
Patent Application entitled "Systems and Methods for Distributing Personal Identification Numbers (PINs) Over Computer Networks," by Miles Paschini, filed Apr. 16, 2009 as U.S. Appl. No. 12/425,259.
Provisional patent application entitled "System and Method for Electronic Prepaid Account Replenishment," by Miles Paschini, filed May 28, 2003 as U.S. Appl. No. 60/473,685.
Piskora, Beth, "EDS' inroads into ATMs give banks pause," Abstract, American Banker, Jun. 29, 1995, 1 page, vol. 18, No. 1, Ref. 8, EDS (Electronic Data Systems), 1994-1995, Lexis/Nexis Database.
Q Comm International, Inc. product information entitled, "Q Comm's Qxpress System; On-Demand Retail Phone Cards," http://web.archive.org/web/20000302140250/www.qcomm.com/products/ondemand.asp, Mar. 2000, 2 pages.
Smart Card Alliance Report PT-03002, "Contactless Payment and the Retail Point of Sale: Applications, Technologies and Transaction Models," Mar. 2003, pp. 1-50.
Splendore, Maurizio, et al., "A new ion ejection method employing an asymmetric trapping field to improve the mass scanning performance of an electrodynamic ion trap," International Journal of Mass Spectrometry, 1999, pp. 129-143, vol. 190/191, Elsevier Science B.V.
Ter Maat, Mike, "The economics of e-cash," IEEE Spectrum, Feb. 1997, pp. 68-73, IEEE.
"The future of money: hearing before the Subcommittee on Domestic and International Monetary Policy of the Committee on Banking and Financial Services, House of Representatives, One Hundred Fourth Congress, first session," The Future of Money, Part 4, http://www.archive.org/stream/futureofmoneyhea04unit/futureofmoneyhea04unit_djvu.txt, Jun. 11, 1996, 5 pages.
"US West Launches Christmas Prepaid Calling Card With Card Pioneer Innovative Telecom;—Sixty Minute Holiday Card Available Now—," Abstract, PR Newswire, Dec. 5, 1997, 1 page, Section: Financial News, Ref. 1, Inovative Telecom, 1994-1997, Lexis/Nexis Database.
"Vendapin Model 5004 Four Selection Cellular and IP, Phone Calling Card, Lottery or Admissions Ticket Printer Vending Machine with Optional Two Selection Cellular Phone Dispenser Console," http://www.vendapin.com/5008.html, Apr. 3, 2000, pp. 1-4, Vendapin.
Visa press release entitled "Visa Unveils Next Generation Electronic Payments and Services," http://corporate.visa.com/newsroom/press-releases/press1124.jsp, May 11, 2011, 3 pages.
Wenninger, John, et al., "The Electronic Purse," Current Issues in Economics and Finance, Apr. 1995, pp. 1-5 plus one information page, vol. 1, No. 1, Federal Reserve Bank of New York.
White, Ron, "How Computers Work," Millennium Edition, 1999, 83 pages, Que Corporation, A Division of Macmillan Computer Publishing, USA.
Office Action dated Jul. 31, 2013 (13 pages), U.S. Appl. No. 13/520,849, filed Jul. 6, 2012.
Office Action dated Aug. 6, 2013 (37 pages), U.S. Appl. No. 12/538,083, filed Aug. 7, 2009.
AFX-Asia, Company News, "Tata Hydro-Electric Q2 to Sept net profit 265.8 mln rupees vs 212.4," Oct. 28, 1999, pp. 1-2, AFX News Limited.
Ameritech Corp., "Ameritech debuts its prepaid cellular," Abstract, RCR Radio Communications Report 15, No. 31, Ref. 7, Aug. 5, 1996, 1 page, Ameritech & ATM, PINS, or Prepaid Cards, 1994-1997, Lexis/Nexis Database.
Ameritech Corp., et al., "Ameritech in Prepaid Card Venture," Abstract, American Banker CLX, No. 205, Ref. 9, Oct. 24, 1995, 1 page, Ameritech & ATM, PINs, or Prepaid Cards, 1994-1997, Lexis/Nexis Database.
Ameritech Corp., "Phone Cards Meet ATMs," Abstract, Bank Technology News 8, No. 12, Ref. 8, Dec. 1995, 2 pages, Ameritech & ATM, PINs, or Prepaid Cards, 1994-1997, Lexis/Nexis Database.
Beach, Kirk W., et al., U.S. Pat. No. 5,892,827, Abstract, Ref. 7, Apr. 6, 1999, 1 page, Catalina Marketing International, Inc., 1994-1997, Lexis/Nexis Database.
Bernkopf, Mark, "Electronic Cash and Monetary Policy," http://ojphi.org/htbin/cgiwrap/bin/ojs/index.php/fm/article/viewFile/465/822, May 6, 1996, pp. 1-6, vol. 1, No. 1, First Monday.
Browne, F. X., et al., "Payments Technologies, Financial Innovation, and Laissez-Faire Banking," The Cato Journal, http://www.cato.org/pubs/journal/cj15n1-6.html, Spring/Summer 1995, 12 pages, vol. 15, No. 1, Cato Institute.
Business Wire entitled "The Winner's Edge.com Announces Purchase Agreement," Nov. 1, 1999, pp. 1-2, West.
Business Wire entitled "Easy Wireless Unveils Its New Internet Powered Accessory Express Kiosk Station," Feb. 25, 2000, pp. 1-2, West.
Business Wire entitled "Easy Wireless Unveils Its Revolutionary Pre-Paid PIN Dispensing Kiosk," Feb. 28, 2000, pp. 1-2, West.
"Card Briefs: Sprint is Using EDS for Phone-Card Plan," Abstract, The American Banker, Section: Credit/Debit/ATMs: p. 19, Mar. 13, 1995, 1 page, Ref. 4, EDS (Electronic Data Systems), 1994-1997, Lexis/Nexis Database.
"Codax Activation System," http://www.carkleen.co.nz/Products/Codax, Car Kleen—Leaders in Vehicle Wash Technology, 2 pages. (no date is available).
Congressional Budget Office Study entitled "Emerging Electronic Methods for Making Retail Payments," Jun. 1996, 63 pages, The Congress of the United States.
Derfler, Jr., Frank J., et al., "How Networks Work," Bestseller Edition, 1996, 69 pages, Ziff-Davis Press, an imprint of Macmillan Computer Publishing, USA.
Filing receipt and specification for provisional patent application entitled "System for Processing, Activating and Redeeming Value Added Prepaid Cards," by Teri Llach, filed Jan. 8, 2010 as U.S. Appl. No. 61/293,413.
Filing receipt and specification for provisional patent application entitled "Efficient Stored-Value Card Transactions," by Ansar Ansari, filed Jun. 14, 2010 as U.S. Appl. No. 61/354,469.
Filing receipt and specification for provisional patent application entitled "Efficient Stored-Value Card Transactions," by Ansar Ansari, filed Jun. 14, 2010 as U.S. Appl. No. 61/354,470.
Filing receipt and specification for provisional patent application entitled "System and Method for Configuring Risk Tolerance in Transaction Cards," by Arindam Kundu, filed Jun. 14, 2010 as U.S. Appl. No. 61/354,474.
Filing receipt and specification for provisional patent application entitled "System and Method for Configuring Risk Tolerance in Transaction Cards," by Arindam Kundu, filed Jun. 30, 2010 as U.S. Appl. No. 61/360,326.
Filing receipt and specification for provisional patent application entitled "Efficient Stored-Value Card Transactions," by Ansar Ansari, filed Jun. 30, 2010 as U.S. Appl. No. 61/360,327.
Filing receipt and specification for provisional patent application entitled "Prepaid Card with Savings Feature," by Kellie D. Harper, filed Aug. 27, 2010 as U.S. Appl. No. 61/377,800.
Filing receipt and specification for provisional patent application entitled "System for Payment via Electronic Wallet," by Tomas Ariel Campos, filed May 31, 2011 as U.S. Appl. No. 61/491,791.
Filing receipt and specification for provisional patent application entitled "System for Payment via Electronic Wallet," by Tomas Ariel Campos, filed May 31, 2011 as U.S. Appl. No. 61/491,813.

(56) References Cited

OTHER PUBLICATIONS

Filing receipt and specification for provisional patent application entitled "System, Method, and Apparatus for Creating and Distributing a Transaction Credit," by Ansar Ansari, filed Jun. 13, 2011 as U.S. Appl. No. 61/496,397.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,404.
Filing receipt and specification for provisional patent application entitled "Stored-Value Card Transaction Systems and Methods," by Ansar Ansari, filed Aug. 31, 2011 as U.S. Appl. No. 61/529,813.
Filing receipt and specification for provisional patent application entitled "Universal Interactive eGift Registration Button aka the Digital Sticker," by Tomas Ariel Campos, filed Feb. 15, 2012 as U.S. Appl. No. 61/599,249.
Filing receipt and specification for provisional patent application entitled "Universal Interactive eGift Registration Button aka the Digital Sticker," by Tomas Ariel Campos, filed Feb. 22, 2012 as U.S. Appl. No. 61/601,911.
Filing receipt and specification for provisional patent application entitled "eWallet with QR Code," by Tomas Ariel Campos, filed Apr. 4, 2012 as U.S. Appl. No. 61/620,173.
Filing receipt and specification for provisional patent application entitled System for Manging CVV Information in Electronic Wallet, by Tushar Vaish, filed Jan. 3, 2012 as U.S. Appl. No. 61/748,679.
Filing receipt and specification for provisional patent application entitled "System and Method for Providing a Security Code," by Tushar Vaish, et al., filed Mar. 15, 2013 as U.S. Appl. No. 61/799,500.
Filing receipt and specification for provisional patent application entitled "System and Method for Using QR Codes in Conjunction with Electronic Stored-Value Cards," by Tomas Ariel Campos, et al., filed Mar. 15, 2013 as U.S. Appl. No. 61/800,704.
Filing receipt and specification for patent application entitled "Transaction Processing Platform for Facilitating Electronic Distribution of Plural Prepaid Services," by Roni Dolev Tamari, et al., filed Dec. 18, 2008 as U.S. Appl. No. 12/338,854.
Filing receipt and specification for patent application entitled "System and Method for Using Intelligent Codes to Add a Stored-Value Card to an Electronic Wallet," by Tomas Ariel Campos, filed Apr. 4, 2013 as U.S. Appl. No. 13/857,048.
Filing receipt and specification for patent application entitled "System and Method for Electronic Prepaid Account Replenishment," by Miles Paschini, filed Jun. 10, 2013 as U.S. Appl. No. 13/914,360.
Foreign communication from a related counterpart application—Search Report, European Application No. 05825880.7, dated Jun. 8, 2011, 6 pages.
Foreign communication from a related counterpart application—Communication, European Application No. 05825880.7, dated June 27, 2011, 1 page.
Foreign communication from a related counterpart application—Search Report, European Application No. 05852818.3, dated Jan. 22, 2009, 9 pages.
Foreign communication from a related counterpart application—Communication, European Application No. 05852818.3, dated May 11, 2009, 1 page.
Foreign communication from a related counterpart application—International Search Report and Written Opinion, PCT/US2004/015658, dated Jun. 22, 2005, 8 pages.
Foreign communication from a related counterpart application—International Preliminary Examination Report, PCT/US2004/015658, dated Mar. 17, 2006, 6 pages.
Foreign communication from a related counterpart application—International Search Report and Written Opinion, PCT/US2005/043705, dated Aug. 10, 2006, 7 pages.
Foreign communication from a related counterpart application—International Preliminary Report on Patentability, PCT/US2005/043705, dated Jun. 13, 2007, 6 pages.
Foreign communication from a related counterpart application—International Search Report and Written Opinion, PCT/US2005/043756, dated Oct. 3, 2006, 6 pages.
Foreign communication from a related counterpart application—International Preliminary Report on Patentability, PCT/US2005/043756, dated Jun. 13, 2007, 6 pages.
Foreign communication from a related counterpart application—International Search Report and Written Opinion, PCT/US2011/020570, dated Mar. 7, 2011, 11 pages.
Foreign communication from a related counterpart application—International Preliminary Report on Patentability, PCT/US2011/020570, dated Jul. 10, 2012, 8 pages.
Foreign communication from a related counterpart application—International Search Report and Written Opinion, PCT/US2012/039981, dated Nov. 5, 2012, 35 pages.
Foreign communication from a related counterpart application—Invitation to Pay Additional Fees, PCT/US2012/039981, dated Aug. 28, 2012, 2 pages.
Foreign communication from a related counterpart application—International Search Report and Written Opinion, PCT/US2011/039996, dated Oct. 24, 2011, 8 pages.
Filing receipt and specification for provisional patent application entitled "Systems and Methods for Proxy Card and/or Wallet Redemption Card Transactions," by Tushar Vaish, et al., filed Mar. 11, 2013 as U.S. Appl. No. 61/776,594.
Filing receipt and specification for provisional patent application entitled "Systems and Methods for Proxy Card and/or Wallet Redemption Card Transactions," by Pranav Sheth, et al., filed Mar. 13, 2013 as U.S. Appl. No. 61/779,334.
Filing receipt and specification for patent application entitled "Systems and Methods for Proxy Card and/or Wallet Redemption Card Transactions," by Tomas Ariel Campos, et al., filed Mar. 11, 2014 as U.S. Appl. No. 14/205,065.
Foreign communication from a related counterpart application—Invitation to Pay Additional Fees, PCT/US2014/010206, dated Mar. 27, 2014, 2 pages.
Office Action dated May 19, 2014 (52 pages), U.S. Appl. No. 14/106,494, filed Dec. 13, 2013.
Advisory Action dated Mar. 25, 2014 (3 pages), U.S. Appl. No. 12/538,083, filed Aug. 7, 2009.
Examiner's Answer dated Oct. 22, 2013 (12 pages), U.S. Appl. No. 13/495,986, filed Jun. 13, 2012.
Office Action dated Mar. 3, 2014 (69 pages), U.S. Appl. No. 13/704,084, filed Dec. 13, 2012.
Filing receipt and specification for International application entitled "System and Method for Providing a Security Code," filed Jan. 3, 2014 as International application No. PCT/US2014/010206.
Filing receipt and specification for patent application entitled "System and Method for Providing a Security Code," by Tushar Vaish, et al., filed Jan. 3, 2014 as U.S. Appl. No. 14/147,330.
Foreign communication from a related counterpart application—Examination Report, New Zealand Application No. 601208, dated Mar. 5, 2014, 2 pages.
Filing receipt and specification for patent application entitled "System for Processing, Activating and Redeeming Value Added Prepaid Cards," by Teri Llach, et al., filed Mar. 14, 2014 as U.S. Appl. No. 14/213,448.
Filing receipt and specification for provisional patent application entitled "Client Directed Pre-Paid Card," by J. DuWayne Milner, filed Mar. 14, 2013 as U.S. Appl. No. 61/781,667.
Office Action dated Mar. 7, 2014 (15 pages), U.S. Appl. No. 12/786,403, filed May 24, 2010.
Filing receipt and specification for patent application entitled "Systems and Methods for Personal Identification Number Distribution and Delivery," by Darren New, et al., filed Oct. 28, 2013 as U.S. Appl. No. 14/065,189.
Filing receipt and specification for patent application entitled "Transaction Processing Platform for Facilitating Electronic Distribution of Plural Prepaid Services," by Roni Dolev Tamari, et al., filed Dec. 13, 2013 as U.S. Appl. No. 14/106,494.
Foreign communication from a related counterpart application—Examination Report, New Zealand Application No. 605666, dated Aug. 9, 2013, 2 pages.

(56) References Cited

OTHER PUBLICATIONS

Foreign communication from a related counterpart application—Examination Report, New Zealand Application No. 607755, dated Dec. 4, 2013, 2 pages.
Office Action dated Oct. 23, 2013 (72 pages), U.S. Appl. No. 13/621,331, filed Sep. 17, 2012.
Office Action (Final) dated Dec. 27, 2013 (19 pages), U.S. Appl. No. 12/538,083, filed Aug. 7, 2009.
Office Action (Final) dated Feb. 7, 2014 (51 pages), U.S. Appl. No. 13/619,176, filed Sep. 14, 2012.
Office Action dated Feb. 19, 2014 (9 pages), U.S. Appl. No. 14/065,189, filed Oct. 28, 2013.
Office Action (Final) dated Dec. 6, 2013 (16 pages), U.S. Appl. No. 10/821,815, filed Apr. 9, 2004.
Advisory Action dated Mar. 10, 2014 (3 pages), U.S. Appl. No. 10/821,815, filed Apr. 9, 2004.
Office Action (Final) dated Feb. 20, 2014 (61 pages), U.S. Appl. No. 13/520,849, filed July 6, 2012.
Office Action dated Mar. 10, 2014 (64 pages), U.S. Appl. No. 13/617,751, filed Sep. 14, 2012.
Advisory Action dated Sep. 30, 2013 (4 pages), U.S. Appl. No. 12/711,211, filed Feb. 23, 2010.
Foreign communication from a related counterpart application—International Preliminary Report on Patentability, PCT/US2014/010206, dated Jul. 7, 2015, 7 pages.
Foreign communication from a related counterpart application—International Preliminary Report on Patentability, PCT/US2013/070991, dated May 26, 2015, 8 pages.
Advisory Action dated Jul. 24, 2015 (13 pages), U.S. Appl. No. 14/106,494, filed Dec. 13, 2013.
Advisory Action dated Aug. 19, 2015 (3 pages), U.S. Appl. No. 14/085,394, filed Nov. 20, 2013.
Office Action dated Jul. 29, 2015 (36 pages), U.S. Appl. No. 14/452,829, filed Aug. 6, 2014.
Office Action dated Oct. 5, 2015 (17 pages), U.S. Appl. No. 13/520,849, filed Jul. 6, 2012.
Office Action dated Oct. 5, 2015 (15 pages), U.S. Appl. No. 13/617,751, filed Sep. 14, 2012.
Advisory Action dated Sep. 23, 2015 (4 pages), U.S. Appl. No. 10/821,815, filed Apr. 9, 2004.
Office Action dated Dec. 31, 2015 (17 pages), U.S. Appl. No. 10/821,815, filed Apr. 9, 2004.
Office Action (Final) dated Sep. 9, 2015 (73 pages), U.S. Appl. No. 12/786,403, filed May 24, 2010.
Advisory Action dated Dec. 16, 2015 (3 pages), U.S. Appl. No. 12/786,403, filed May 24, 2010.
Office Action (Final) dated Oct. 20, 2015 (34 pages), U.S. Appl. No. 12/711,211, filed Feb. 23, 2010.
Office Action dated Sep. 15, 2015 (78 pages), U.S. Appl. No. 14/636,092, filed Mar. 2, 2015.
Office Action dated Oct. 2, 2015 (20 pages), U.S. Appl. No. 12/538,083, filed Aug. 7, 2009.
Office Action (Final) dated Jan. 13, 2016 (45 pages), U.S. Appl. No. 13/704,084, filed Dec. 13, 2012.
Office Action dated Oct. 1, 2015 (29 pages), U.S. Appl. No. 13/619,226, filed Sep. 14, 2012.
Office Action dated Nov. 5, 2015 (111 pages), U.S. Appl. No. 13/857,048, filed Apr. 4, 2013.
Office Action dated Nov. 17, 2015 (15 pages), U.S. Appl. No. 14/085,394, filed Nov. 20, 2013.
Office Action dated Feb. 2, 2016 (106 pages), U.S. Appl. No. 14/213,448, filed Mar. 14, 2014.
Office Action (Final) dated Apr. 20, 2016 (27 pages), U.S. Appl. No. 13/617,751, filed Sep. 14, 2012.
Office Action (Final) dated Apr. 20, 2016 (23 pages), U.S. Appl. No. 12/711,211, filed Feb. 23, 2010.
Office Action dated Apr. 25, 2016 (31 pages), U.S. Appl. No. 12/538,083, filed Aug. 7, 2009.
Examiner's Answer dated Mar. 30, 2016 (6 pages), U.S. Appl. No. 14/106,494, filed Dec. 13, 2013.
Advisory Action dated Mar. 23, 2016 (4 pages), U.S. Appl. No. 13/704,084, filed Dec. 13, 2012.
Office Action (Final) dated Mar. 24, 2016 (26 pages), U.S. Appl. No. 14/452,829, filed Aug. 6, 2014.
Office Action (Final) dated Mar. 8, 2016 (26 pages), U.S. Appl. No. 13/619,226, filed Sep. 14, 2012.
Office Action (Final) dated May 9, 2016 (26 pages), U.S. Appl. No. 14/085,394, filed Nov. 20, 2013.
Office Action (Final) dated Aug. 8, 2016 (31 pages), U.S. Appl. No. 10/821,815, filed Apr. 9, 2004.
Advisory Action dated Jun. 29, 2016 (3 pages), U.S. Appl. No. 12/711,211, filed Feb. 23, 2010.
Office Action (Final) dated Jan. 29, 2016 (21 pages), U.S. Appl. No. 13/619,176, filed Sep. 14, 2012.
Office Action (Final) dated Jul. 12, 2016 (36 pages), U.S. Appl. No. 13/483,711, filed May 30, 2012.
Office Action (Final) dated May 18, 2016 (32 pages), U.S. Appl. No. 13/857,048, filed Apr. 4, 2013.
Advisory Action dated Aug. 10, 2016 (2 pages), U.S. Appl. No. 13/857,048, filed Apr. 4, 2013.
Advisory Action dated Jul. 15, 2016 (3 pages), U.S. Appl. No. 14/085,394, filed Nov. 20, 2013.
Office Action (Final) dated Jul. 28, 2016 (40 pages), U.S. Appl. No. 14/213,448, filed Mar. 14, 2014.
Office Action (Final) dated Sep. 26, 2016 (37 pages), U.S. Appl. No. 13/520,849, filed Jul. 6, 2012.
Advisory Action dated Oct. 20, 2016, (3 pages), U.S. Appl. No. 10/821,815, filed Apr. 9, 2004.
Examiner's Answer dated Oct. 19, 2016 (9 pages), U.S. Appl. No. 12/786,403, filed May 24, 2010.
Office Action dated Oct. 5, 2016 (19 pages), U.S. Appl. No. 12/711,211, filed Feb. 23, 2010.
Notice of Allowance dated Sep. 29, 2016 (7 pages), U.S. Appl. No. 14/636,092, filed Mar. 2, 2015.
Office Action (Final) dated Nov. 29, 2016 (25 pages), U.S. Appl. No. 12/538,083, filed Aug. 7, 2009.
Office Action dated Oct. 19, 2016 (54 pages), U.S. Appl. No. 13/704,084, filed Dec. 13, 2012.
Advisory Action dated Oct. 13, 2016 (3 pages), U.S. Appl. No. 13/483,711, filed May 30, 2012.
Examiner's Answer dated Nov. 25, 2016 (16 pages), U.S. Appl. No. 13/619,226, filed Sep. 14, 2012.
Office Action dated Nov. 2, 2016 (33 pages), U.S. Appl. No. 13/857,048, filed Apr. 4, 2013.
Office Action dated Sep. 30, 2016 (27 pages), U.S. Appl. No. 14/085,394, filed Nov. 20, 2013.
Advisory Action dated Oct. 19, 2016 (3 pages), U.S. Appl. No. 14/213,448, filed Mar. 14, 2014.
Office Action dated Nov. 28, 2016 (39 pages), U.S. Appl. No. 14/213,448, filed Mar. 14, 2014.
Filing receipt and specification for patent application entitled "System and Method for Electronic Prepaid Account Replenishment," by Miles Paschini, et al., filed Dec. 19, 2016 as U.S. Appl. No. 15/383,680.
Filing receipt and specification for provisional patent application entitled "Mimicking Post-Paid User Experience with Stored-Value Card Accounts," by Richard Gotlieb, filed Oct. 26, 2015 as U.S. Appl. No. 62/246,126.
Filing receipt and specification for patent application entitled "Systems and Methods for Mimicking Post-Paid User Experience with Stored-Value Card Accounts," by Richard Gotlieb, filed Oct. 26, 2016 as U.S. Appl. No. 15/335,086.
Advisory Action dated Dec. 15, 2016 (3 pages), U.S. Appl. No. 13/520,849, filed Jul. 6, 2012.
Office Action dated Jan. 11, 2017 (27 pages), U.S. Appl. No. 10/821,815, filed Apr. 9, 2004.
Advisory Action dated Mar. 1, 2017 (3 pages), U.S. Appl. No. 12/538,083, filed Aug. 7, 2009.
Office Action (Final) dated Jan. 13, 2017 (21 pages), U.S. Appl. No. 13/619,176, filed Sep. 14, 2012.
Advisory Action dated Mar. 21, 2017 (3 pages), U.S. Appl. No. 13/619,176, filed Sep. 14, 2012.

(56) References Cited

OTHER PUBLICATIONS

Office Action dated Mar. 20, 2017 (31 pages), U.S. Appl. No. 13/819,469, filed Jul. 1, 2013.
Office Action (Final) dated Dec. 22, 2016 (13 pages), U.S. Appl. No. 13/483,711, filed May 30, 2012.
Advisory Action dated Mar. 17, 2017 (3 pages), U.S. Appl. No. 13/483,711, filed May 30, 2012.
Office Action dated Mar. 7, 2017 (131 pages), U.S. Appl. No. 14/147,330, filed Oct. 4, 2016.
Office Action dated Mar. 16, 2017 (131 pages), U.S. Appl. No. 14/205,065, filed Mar. 11, 2014.
Office Action (Final) dated Apr. 4, 2017 (85 pages), U.S. Appl. No. 13/704,084, filed Dec. 13, 2012.
Office Action dated Apr. 20, 2017 (30 pages), U.S. Appl. No. 13/520,849, filed Jul. 6, 2012.
Notice of Allowance dated Sep. 18, 2017 (12 pages), U.S. Appl. No. 13/520,849, filed Jul. 6, 2012.
Office Action dated May 30, 2017 (40 pages), U.S. Appl. No. 13/617,751, filed Sep. 14, 2012.
Office Action (Final) dated Oct. 16, 2017 (16 pages), U.S. Appl. No. 13/617,751, filed Sep. 14, 2012.
Advisory Action dated Aug. 1, 2016 (2 pages), U.S. Appl. No. 13/617,751, filed Sep. 14, 2012.
Office Action (Final) dated Jul. 11, 2017 (26 pages), U.S. Appl. No. 10/821,815, filed Apr. 9, 2004.
Advisory Action dated Sep. 20, 2017, (3 pages), U.S. Appl. No. 10/821,815, filed Apr. 9, 2004.
Office Action (Final) dated May 3, 2017 (26 pages), U.S. Appl. No. 12/711,211, filed Feb. 23, 2010.
Advisory Action dated Sep. 1, 2017 (3 pages), U.S. Appl. No. 12/711,211, filed Feb. 23, 2010.
Office Action dated May 18, 2017 (10 pages), U.S. Appl. No. 15/383,680, filed Dec. 19, 2016.
Office Action (Final) dated Sep. 6, 2017 (5 pages), U.S. Appl. No. 15/383,680, filed Dec. 19, 2016.
Notice oif Allowance dated Oct. 10, 2017 (7 pages), U.S. Appl. No. 15/383,680, filed Dec. 19, 2016.
Office Action dated Jun. 29, 2017 (26 pages), U.S. Appl. No. 12/538,083, filed Aug. 7, 2009.
Office Action (Final) dated Jan. 2, 2018 (25 pages), U.S. Appl. No. 12/538,083, filed Aug. 7, 2009.
Office Action dated Jul. 20, 2017 (21 pages), U.S. Appl. No. 13/619,176, filed Sep. 14, 2012.
Advisory Action dated Jun. 16, 2017 (5 pages), U.S. Appl. No. 13/704,084, filed Dec. 13, 2012.
Office Action dated Nov. 13, 2017 (82 pages), U.S. Appl. No. 13/704,084, filed Dec. 13, 2012.
Office Action dated Nov. 20, 2017 (24 pages), U.S. Appl. No. 13/483,711, filed May 30, 2012.
Office Action (Final) dated Jun. 27, 2017 (27 pages), U.S. Appl. No. 14/147,330, filed Jan. 3, 2014.
Advisory Action dated Sep. 20, 2017 (3 pages), U.S. Appl. No. 14/147,330, filed Jan. 3, 2014.
Office Action dated Apr. 3, 2017 (38 pages), U.S. Appl. No. 14/452,829, filed Aug. 6, 2014.
Office Action (Final) dated Oct. 17, 2017 (21 pages), U.S. Appl. No. 14/452,829, filed Aug. 6, 2014.
Advisory Action dated Dec. 8, 2017 (3 pages), U.S. Appl. No. 14/452,829, filed Aug. 6, 2014.
Office Action dated Sep. 29, 2017 (21 pages), U.S. Appl. No. 14/379,210, filed Aug. 15, 2014.
Office Action (Final) dated May 17, 2017 (45 pages), U.S. Appl. No. 13/857,048, filed Apr. 4, 2013.
Office Action (Final) dated Feb. 15, 2017 (23 pages), U.S. Appl. No. 14/085,394, filed Nov. 20, 2013.
Advisory Action dated Apr. 21, 2017 (3 pages), U.S. Appl. No. 14/085,394, filed Nov. 20, 2013.
Office Action dated Sep. 29, 2017 (24 pages), U.S. Appl. No. 14/085,394, filed Nov. 20, 2013.
Office Action (Final) dated Sep. 7, 2017 (34 pages), U.S. Appl. No. 14/205,065, filed Mar. 11, 2014.
Advisory Action dated Nov. 16, 2017 (3 pages), U.S. Appl. No. 14/205,065, filed Mar. 11, 2014.
Office Action (Final) dated May 5, 2017 (49 pages), U.S. Appl. No. 14/213,448, filed Mar. 14, 2014.
Advisory Action dated Jul. 10, 2017 (3 pages), U.S. Appl. No. 14/213,448, filed Mar. 14, 2014.
Office Action dated Sep. 5, 2017 (21 pages), U.S. Appl. No. 14/213,448, filed Mar. 14, 2014.

\* cited by examiner

PREPAID CARD WITH SAVINGS FEATURE

CROSS-REFERENCE TO RELATED APPLICATIONS

This application is a filing under 35 U.S.C. 371 of International Application No. PCT/US2011/049338 filed Aug. 26, 2011, entitled "Prepaid Card with Savings Feature," which claims priority to U.S. Provisional Patent Application No. 61/377,800 filed Aug. 27, 2010, which applications are incorporated by reference herein in their entirety.

BACKGROUND

Over a quarter of the households in the United States are either unbanked or underbanked, i.e., these households do not make use of the financial opportunities/services afforded by customary banking establishments. Moreover, the market for stored-value cards, e.g., gift cards, continues to grow to unprecedented levels. As such, stored-value card consumers, many of whom may be underbanked, would likely desire the ability to make financial transactions beyond merely debiting from a fixed, stored value. These stored-value card consumers, may also desire to participate in savings activities utilizing their stored-value card account(s). As such, stored-value cards with additional transaction/savings capabilities are needed.

SUMMARY OF THE INVENTION

A financial account system is disclosed. A system includes a stored-value card, a first financial account directly accessible via the stored-value card and a second financial account associated with the first financial account. Funds may be transferred between the first and the second financial account.

DETAILED DESCRIPTION

Figure 1A:
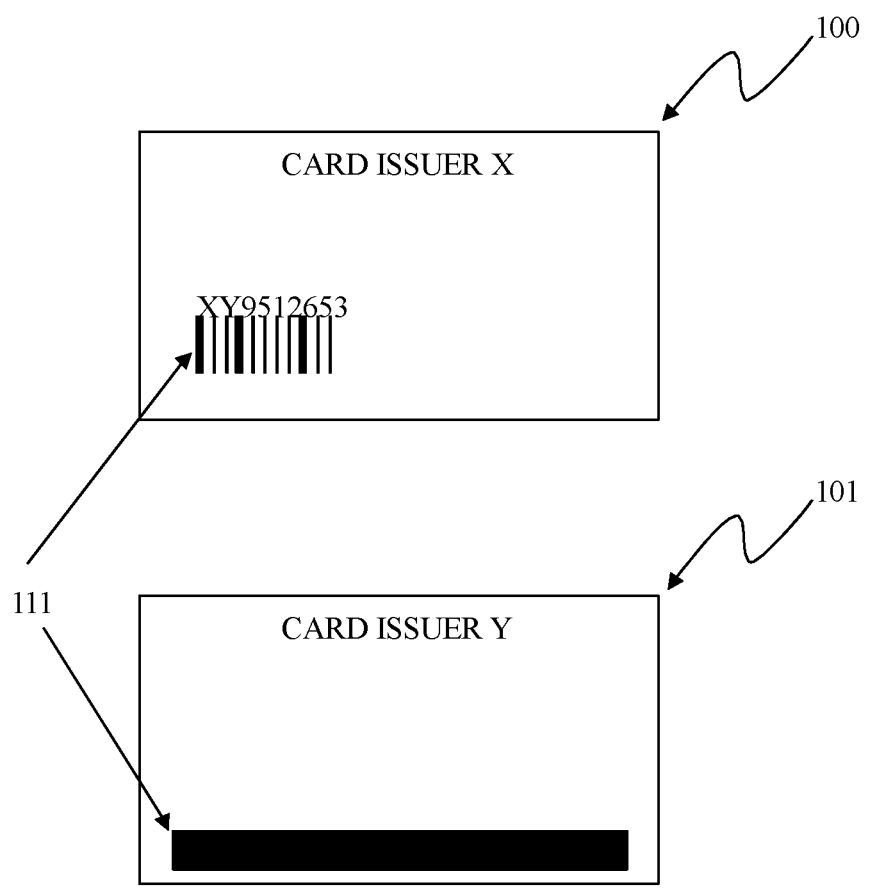
FIG. 1A illustrates a physical view of stored-value cards in accordance with at least some illustrated embodiments.

As used herein, stored-value card refers to a physical and/or virtual embodiment of a transaction facilitating means that may be used to transact business with a party willing to accept the card, for example as tender for a purchase. Examples of such cards include credit cards, debit cards, gift cards, telephone cards, loyalty cards, membership cards, transaction cards, ticket cards, entertainment cards, sports cards, prepaid cards, virtual cards, e-cards, and the like. Stored-value cards may have various affiliated or non-affiliated card issuers. Stored-value cards may be open-loop (e.g., useable with parties accepting payment from a particular payment network), closed-loop (e.g., useable with a particular merchant), and semi-closed loop (e.g., useable with a designated group of merchants). In at least one embodiment, the cards are wallet-sized and made of plastic. In various embodiments, the stored-value card may be a type of card such as a gift card or prepaid card that requires activation at a POS. For example, a stored-value card may be purchased and activated at a POS by a consumer and subsequently used by the consumer or another to transact business.

Consumer use of stored-value cards typically involves a card vendor, a redeeming merchant, a transaction facilitator, a transaction processor, a card processor, and a card issuer (generally, "card party"). In various embodiments, the card vendor, redeeming merchant, the transaction facilitator, the transaction processor, the card processor, and the card issuer may be the same, different, related entities, or combinations thereof. The POS where stored-value cards are purchased and activated may be referred to as the card vendor or simply vendor. An entity that will accept stored-value card for business transactions, for example as tender for a purchase, may be referred to as a redeeming merchant. An entity that provides a means for other card parties to communicate concerning a stored-value card transaction may be referred to as a transaction facilitator. An entity that provides card parties' information, validation and/or authorization for card transactions may be referred to as a transaction processor. An entity that provides the financial backing via the stored-value card may be referred to as the card issuer or simply issuer. An entity that processes card transactions for a card issuer may be referred to as a card processor. An entity that manages the card program for an issuer may be referred to as a card program manager.

In at least one embodiment, the issuer is identified on the stored-value card and associates a unique issuer account number or, in some instances, a proxy account number with each stored-value card. Card issuers include direct issuers of cards such as store-branded cards, and in some embodiments the card vendor may also be the card issuer and/or the redeeming merchant. Card issuers also include banks, financial institutions, and transaction processors such as VISA®, MasterCard®, American Express®, etc., and cards issued by such institutions may be readily accepted by a number of redeeming merchants to conduct transactions such as purchases. In some instances, the redeeming merchant may be identified on the stored-value card (for example, a retailer branded card such as Store X), and such cards may be sold at the same or different card vendor (e.g., card vendor is Store X or a different or unrelated Store Z). In such instances, the Store X branded stored-value card may be issued by Store X, by Store Z, or by a third party such as bank or financial institution.

FIG. 1A depicts the stored-value card 100, 101 in accordance with the some embodiment. Stored-value cards 100, 101 may be issued from independent, non-affiliated card issuers, or multiple cards could be issued from the same and/or affiliated card issuers. The stored-value cards 100, 101 may be fabricated from a suitable material, such as plastic, paper, a plastic-coated paper, laminates, or combinations thereof. The stored-value cards 100, 101 are typically made in a thickness range of from about 0.005 to about 0.040 inch.

The stored-value card 100, 101 bears an identifier 111. The stored-value card identifier 111 is unique to the stored-value card and associates the stored-value card to a unique account maintained by the card issuer. The stored-value card identifier may be encoded to a magnetic strip, bar code, a series of numerals, a series of letters, or a combination thereof. In one embodiment, the stored-value card 100, 101 may also be fashioned with a personal identification number, or PIN, to be entered during the course of the transaction, that corresponds to the stored-value card identifier 111 and allows access and/or use of the stored-value card account.

In some embodiments, the stored-value card may comprise a card security code (CSC), a card verification value (CVV or CV2), a card verification value code (CVVC), a card verification code (CVC), verification code (V-code or V code), card code verification (CCV), credit card ID (CCID), or combinations thereof.

In some embodiments, stored-value cards 100, 101 may have magnetic strips located on the card. The magnetic strip may be made via conventional construction, such as one deposited from a slurry, positioned on the card 100, 101 so that it can be scanned in well-known magnetic strip reading equipment. A terminal such as Tranz 380 may be Verifone is suitable in this application. For additional security, the card verification may be also subject to an encryption algorithm, many of which are well-known in the art, prior to encoding on the magnetic strip. Encoded in the magnetic strip may be a representation of the stored value card identifier 111 and/or the PIN.

In an embodiment of the stored-value card 100, 101, the cards comprise a bar code of conventional construction, such as a universal product code (UPC), e.g., a GS1-128 or UCC/EAN-128), positioned on the stored-value card 100, 101 so that it can be scanned by well-known bar code reading equipment. Encoded in the bar code on the stored-value card may be a representation of the stored value card identifier 111 and/or the PIN.

In some embodiments of the stored-value card identifier 111, RFID tags, microprocessors, and/or microchips may be placed on the stored-value card 100, 101 to be interpreted by specifically configured devices. The RFID tags, microprocessors, and/or microchips may be used in addition to or in place of the bar code and/or the magnetic strip, or may be used in combination with these other means of encoding stored-value card identifier 111 and/or the PIN.

In some embodiments, series of numerals, series of letters, or combinations thereof may be placed on the stored-value card 100, 101 to be read or interpreted by a human or a device, i.e., optical character recognition device, configured to interpret a series of shapes according to the stored-value card identifier 111.

Figure 1B:
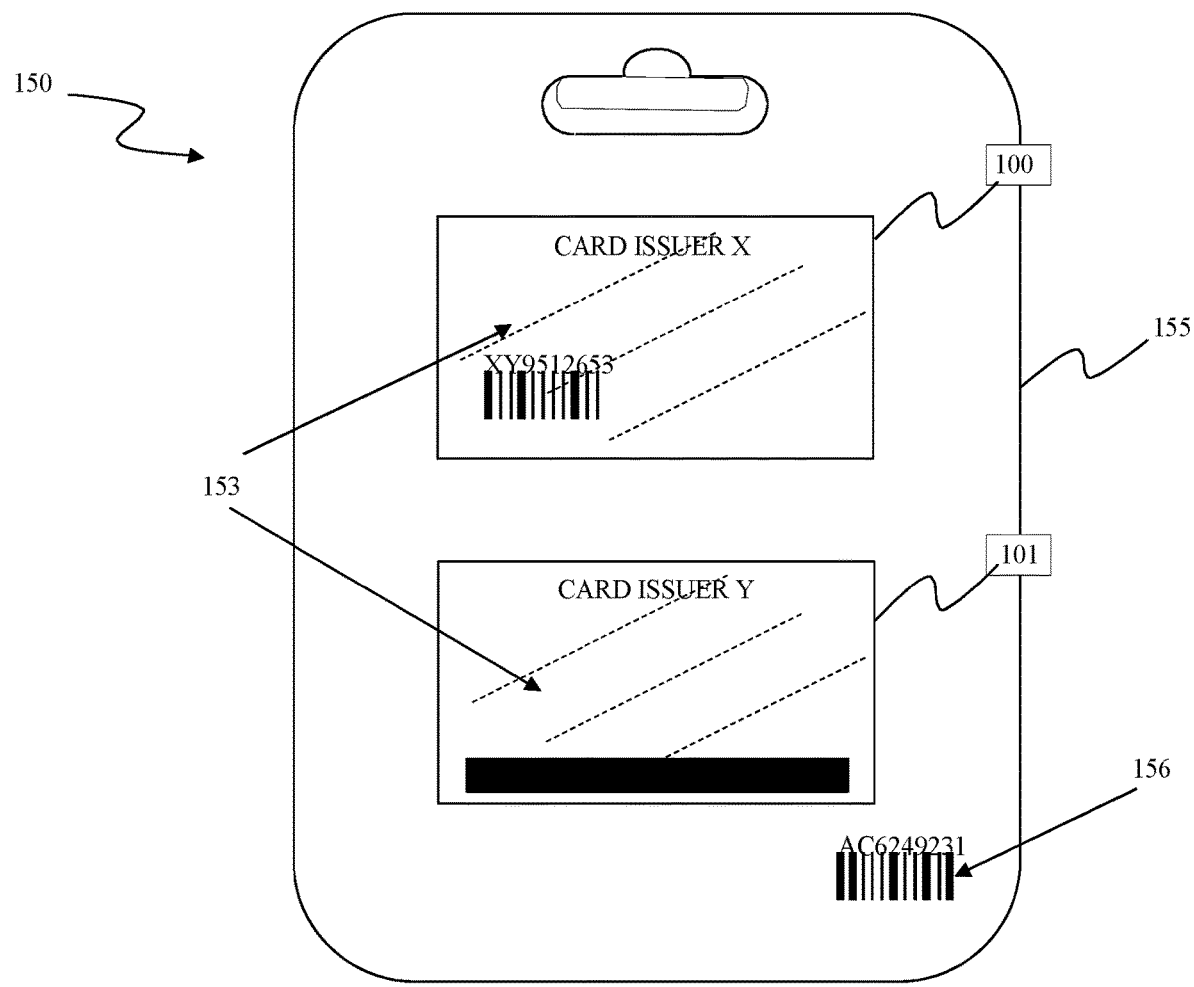
FIG. 1B illustrates a physical view of stored-value card package in accordance with at least some illustrated embodiments.

FIG. 1B depicts the stored-value card 100, 101 package in accordance with the some embodiment. Package 150 is distinct and separate from the individual transaction cards. Packages 150 may be formed from paper, plastic, plastic-coated paper, laminate, or combinations thereof. For example, the package may be made of a 15-point coated one-side board stock, although it may be a laminated board or other laminate. Preferably, if the package secures transaction cards comprising PINs, the package backing material is opaque, to obscure the PINs on the transaction card 100, 101 as described above. A transparent shrink wrap plastic film 152 (not shown), applied using well-known methods, may be used to cover the transaction cards 100, 101 and to secure the transaction cards 100, 101 to packages 150. In the alternative, a transparent plastic cover 153 with an appropriately sized, generally rigid, embossed area accommodating the transaction cards 100, 101 may be incorporated, forming a structure commonly known as a "blister pack" 155. The packages 150 may be imprinted with decorations, advertising, coupons, instructions, or other information as will now be apparent to those skilled in the art. Packages 150 are presented for illustrative purposes only and are not intended to represent the every embodiment of packages capable of being formed to secure multiple individual transaction cards. For example, package assemblies could be constructed to secure 3, 4, 5, 6, 7, 8, 9, 10 or any plurality of cards, from any number of affiliated or non-affiliated card issuers. Additionally, package assemblies could be fashioned from any industry-accepted material with individual transaction cards secured in any industry-accepted manner. Furthermore, these packages could be formed or constructed in a plurality of shapes or presentations comprising a plurality of decorative, informational, promotional, or other information as would be apparent to those skilled in the art.

The package 150 bears an identifier 156. The package identifier 156 is unique to the package and is linked to the transaction cards, and more specifically, to the transaction card identifiers secured by the package. The package identifier may be encoded in a bar code, a magnetic strip, radio frequency identification (RFID) tags, microprocessors, microchips, a series of numerals, a series of letters, UPC, or a combination thereof. The package identifier 156 may be positioned anywhere on the package whereby it is capable of being interpreted by a POS interpretation component.

In an alternative embodiment, the stored-value card is a virtual card, i.e., the card does not comprise a physical/tangible embodiment, but rather is accessible via internet, telephonic, and/or other electronic network access mechanisms, e.g., web pages, smart phone apps, interactive voice response programs, and the like. The virtual stored-value card comprises a unique identifier and associates the stored-value card to at least one account maintained by a card issuer. The virtual stored-value card identifier may be represented by a series of numerals, a series of letters, or a combination thereof. In one embodiment, the virtual stored-value card may also be fashioned with a personal identification number, or PIN, to be entered during the course of the transaction, that corresponds to the virtual stored-value card identifier and allows access and/or use of the virtual stored-value card associated account(s).

Figure 2:
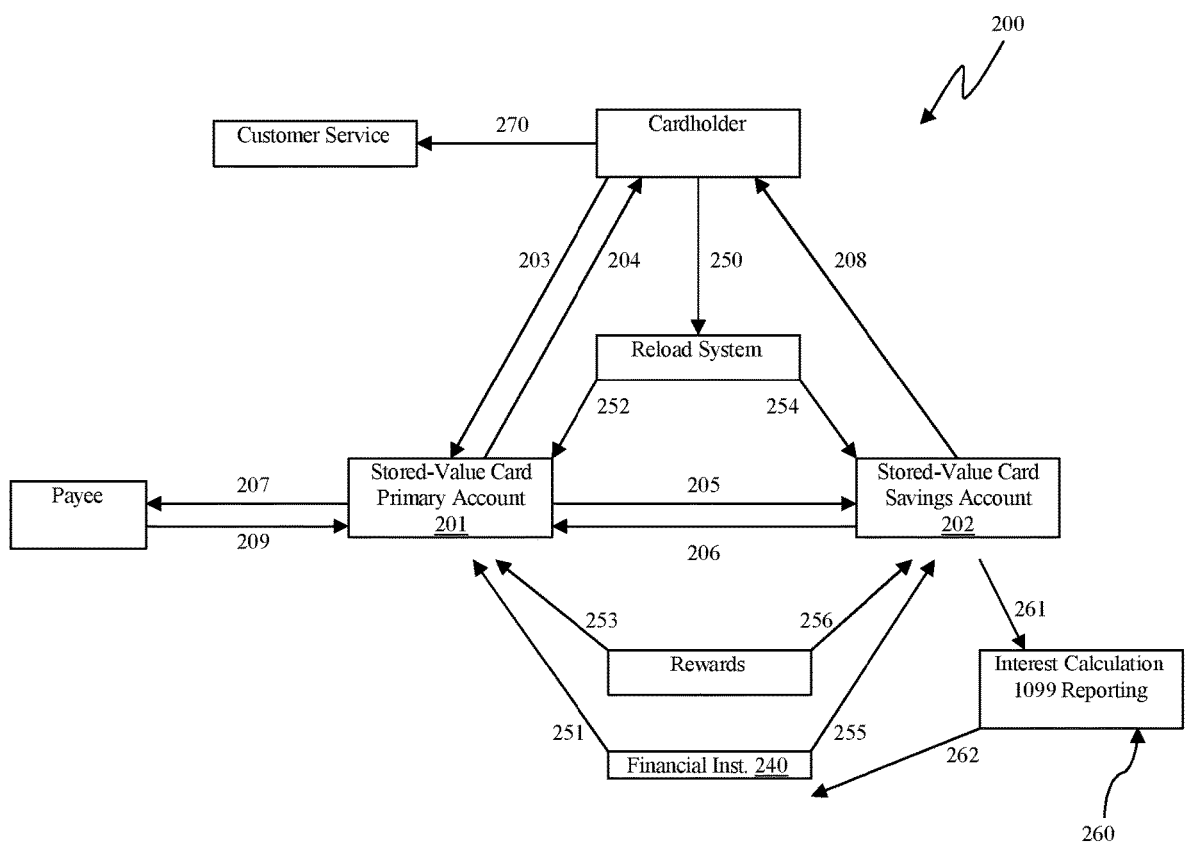
FIG. 2 illustrates a schematic representation of a financial system for a stored-value card with savings in accordance with at least some illustrated embodiments.

FIG. 2 illustrates one embodiment of a financial system 200 for a stored-value card. A stored-value card may have one or more financial accounts 201, 202 associated with the card. The cardholder or consumer (used interchangeably herein) may directly access the balance of the first financial account 201 (used interchangeably with "main financial account" or "primary financial account") via the stored-value card. The balance of the second financial account 202 (used interchangeably with "secondary account" or "savings account") may be accessed through the first financial account 201. In other words, the cardholder may not settle a transaction with a payee (e.g., vendor) with funds directly from the second financial account 202 by using the stored-value card. A debit transaction 207 to a payee may occur through the primary account 201. This is similar to the concept of a savings account linked with a checking account. Limiting direct access to the second financial account 202 may offer incentives to the cardholder to treat it as a savings fund, thereby fostering prudent financial planning. The stored-value card with a savings feature may serve as an alternative or a complement to traditional bank accounts where both checking and savings account can be accessed directly from a consumer's bank card. A stored-value card with a savings feature, however, offers additional flexibility to link multiple primary accounts with a single secondary savings account, link multiple savings account with a single primary account, or a combination thereof.

In alternative embodiments, the balance of the second financial account 202 may be accessed through the first financial account 201. In other words, the cardholder may settle a transaction with a payee (e.g., vendor) with funds directly from the second financial account 202 by using the stored-value card.

It is contemplated that the systems, methods, and objects described herein may be employed in many varying jurisdictions, e.g., countries, geo-political associations, and/or other economically affiliations, comprising varying laws, regulations, rules, requirements, and/or procedures for establishing, maintaining, effectuating, monitoring, insuring, regulating, and participating in financial activities. As such, while the following discussion will be presented in a United States-based context, it must be understood that all of the U.S. terms and concepts may be interchanged with like terms and concepts, as such terms and concepts would be understood by those of ordinary skill in the art, for any and all other jurisdictions in which the disclosed systems and concepts may be implemented. For example, it should be understood that "social security number" and/or "tax identification number" corresponds to any other form of distinguisher capable of uniquely identifying an individual (real person or legally-recognized entity). Another example may be specifically identified U.S. forms and documentation, e.g., W-9s, 1099s, which may have equivalent or equivalents in other jurisdictions for providing information to the jurisdiction's governing bodies and/or agencies, thus, compliance with other jurisdictions documentation and papering requirements is hereby disclosed. Also, other jurisdictions may have similar regulations and disclosure requirements as the U.S. Regulation-DD/D/E and Truth in Savings Act (TISA) requirements and disclosures, as such, those jurisdictions rules and regulations are contemplated and would be readily substituted by those of ordinary skill in the art for the U.S.-described rules and regulations set forth herein.

In some embodiments, a bank that is insured with the Federal Deposit Insurance Corporation (FDIC) may sponsor the stored-value cards with savings feature, and the accounts would be Regulation-DD/D/E compliant with appropriate TISA disclosures. The stored-value card primary account and all related account information may be maintained and supported as a separate and unique account from the primary stored-value card account. Because a stored-value card with a savings feature is a regulated savings account, there are regulatory and legal requirements that entitle a cardholder to certain information and product utility. At least in some embodiment, such requirements may include: savings account application, which includes product feature description and an eSign certification; ability to view account balance; ability to view and print transaction history, which is archived for at least 6 months; account data archived for 7 years; ability to transfer funds from the primary account to the savings account (both automatic transfers and one-time transfers), where the number of transfers are not limited; ability to transfer funds from the savings account to the primary account, where the cardholder may not initiate more than six transfers per calendar month; ability to view savings terms and conditions; and/or ability to view current interest rate annual percentage rate (APR), annual percentage yield (APY), and interest payments year-to-date (YTD). Cardholders may be offered additional product utility or functionality, such as the ability view budgeting tool, progress towards savings goal, make edits, and select categories in some embodiments. Cardholders may also be allowed to select communication preference (e.g., notices for goal progress, when money is added to the savings account, when interest is paid, etc.).

At least in some embodiments, only eligible cardholders of the stored-value cards may open a secondary savings account. The eligibility criteria may include the following: (a) be in an eligible program on the processing system, as defined by the card issuer; (b) have an active, registered stored-value card; (c) have a valid social security number (SSN), tax identification number (TIN), passport, and/or alien resident identification; and (d) be the primary card owner. Eligible cardholders may complete an application for a secondary savings account at a participating point of sale. In some embodiments, cardholders with stored-value card primary account 201 may be prescreened for eligibility and be mailed an application form to add the savings feature.

In an alternative embodiment, eligible cardholders may visit a website where they can complete an eSign application apply for a stored-value card with a savings feature and create an online account associated with the card. A cardholder who has a stored-value card with a primary account 201 may be shown the option to apply for a savings account 202 when they log into the cardholder website online account if they are eligible according to the defined eligibility requirements. At the account opening screens, eligible cardholders will be required to accept the terms and conditions of the savings account, confirm their mailing address, validate their SSN or TIN, and complete eSign certification. If the SSN or TIN does not match the card SSN, an error message will display and they may not proceed. Similarly, if the cardholder does not agree to the terms and conditions or to eSign they may not be eligible for the account. Under U.S. law, the eligible cardholder may be required to certify three components of a W-9 form: that their SSN is correct, that they are not subject to backup withholding, and that they are a U.S. Citizen or U.S. Resident Alien. The cardholder may not be allowed to continue with the application process if they do not check these boxes off at the close of the application. Accounts may not be opened if a cardholder is subject to backup withholding. Once a cardholder elects to open a savings account 202, the savings features may be integrated into the primary account 202 cardholder website.

A minimum opening deposit for the saving account 202 may be required at least in some embodiments, e.g., a minimum deposit of $1, $5, $10, $20, $50, or $100. The opening deposit may be funded from a positive primary account 201 balance. If the card balance does not cover the minimum amount, the cardholder may be presented with a message stating they do not have sufficient funds in the card to cover the minimum opening requirement. A cardholder may choose one-time or automated funding options thereafter with a minimum transaction amount of $1. Moreover, the minimum opening deposit for the savings account, as well as required balances associated with the first financial account and the savings account may be determined by the stored-value card issuer, a financial account manager, a sponsor bank, or combinations thereof. Furthermore, pursuant to the parties provisions, the first financial account and/or the second financial may remain open and viable regardless of any timing issues and/or balance amount values.

At least in some embodiments, cardholders may not perform any other monetary transaction directly on the balance of the savings account 202, e.g., access through an automatic teller machine (ATM), electronic bill payment, wire transfer, or POS transactions. Savings account 202 numbers may be masked to prevent the cardholder from performing transactions that could directly fund or withdrawal from the account. This is to ensure that the cardholder uses the secondary savings account 202 as intended, i.e., as a savings fund and not as a primary account for transactions with third parties. Consequently, there may be at least four transaction codes values associates with a savings account 202 at least in some embodiments. They are: (1) transfer 206 from savings 202 to primary account 201; (2) transfer 205 to savings 202 from primary account 201; (3) interest payment 255; and 4) transfer from savings 202 to primary account 201 to offset the negative balance of the primary account 201. The transaction codes may be configurable to correspond to stored-value card issuer, sponsor bank, and/or financial manager desired parameters. If primary account 201 balance is negative for at least 90 consecutive days, all balances held in the savings account 202 can be used to offset any negative primary account 201. These transactions may be automatic and may not require cardholder authorization; however, they will be noted as such on the cardholder statement.

The cardholder may initiate 203 a financial transaction against the primary account 201 balance. The types of cardholder-initiated transactions may include a transfer to 205 or from 206 the secondary account 202 and/or a payment 207 to a payee. In some embodiments, the cardholder may also use a system that enables a reload/recharge/top-up functionality (referred to as "reload system" herein). The reload system is more specifically detailed in U.S. Pat. Nos. 7,131,578; 7,909,242, which are incorporated by reference herein in their entirety. The reload system allows a cardholder to deposit 250 additional funds ("reload deposit") into the primary 201 and/or the secondary 202 accounts.

At least in some embodiments, funds may be added to the primary account 201 in various ways, including: (a) transfer from 206 the secondary account 202; (b) direct deposit 251 from financial institutions 240 (e.g., from the cardholder employer's bank); (c) reload deposit 252; and/or (d) reward 253 from the card issuer or participating vendors (e.g., cash-back reward, rebate, coupon, gift card, etc.). In one embodiment, the payee may refund 209 an amount of money back to the primary account from which a purchase was made (e.g., the cardholder returns a product to a merchant). Similarly, the secondary account may be funded in various ways, including: (a) transfer from 205 the primary account 201; (b) interest payment 255; (c) reload deposit 254 that is a percentage or a designated dollar amount fraction of the reload deposit 252 to the primary account 201; and/or (d) reward 256 from the card issuer or participating vendors.

A stored-value card with a savings feature allows the cardholders to easily move funds from their primary account 201 to their savings account 202 and vise versa. As noted above, however, the cardholder is limited by law to six transfers out of the savings account 202 to the primary account 201 per calendar month. The cardholders may designate one-time transfers through the cardholder website, IVR, or with a customer service representative. The cardholder may also establish and automated transfers 205, 206 between the primary account 201 and the savings account 202. To encourage savings, cardholders may be presented with option to automatically fund the savings account 202 from the primary account 201 that may be triggered by various transaction events, including: (a) upon receiving a direct deposit 251, (b) when a reload deposit 252 occurs, and/or (c) at a designated time interval (e.g., recurring weekly or monthly). The cardholder can elect all, some, or none of the options available. Moreover, the above events may be transacted regardless of the first financial account and/or the second financial account's current balance. The cardholder may have the ability to select an amount or percent of funds loaded onto primary account 201. Where the customer chooses a time interval for automatic transfers, the cardholder may be able to select a preferred date. The consumer would have the flexibility to update, edit, or otherwise change the automatic funding option at any time. Any negative primary account 201 balances may need to be cured prior to initiating any automatic or one-time transfers to 205 the savings account 202. If an automatic transfer cannot be fully funded or cannot be funded at all, any amounts available will be taken from the primary account 201 to the savings account 202 and a notification will be provided to the cardholder describing the transaction. Automatic transfers will continue thereafter for the designated transfer option and amount.

To encourage cardholders to accrue higher savings balances, cardholders may be presented with incentives such a reduction or elimination of account service fees, fees which are configurable to correspond to bank, stored-value card issuer, and/or financial mananger desired parameters. For example, if a cardholder establishes a recurring direct deposit 251 onto the primary account 201 for at least $100 per month with an automated transfer of at least $5 to 205 the savings account 202, the entire monthly fee may be waived. Other incentives may include reducing the monthly stored-value card fee by 50% when a cardholder maintains a $25 savings balance for at least one complete month. If the savings balance subsequently drops below $25, the monthly fee will be imposed and will continue to be imposed in any months where the savings balance is below the threshold. Conversely, if the savings balance is again maintained, for at least one month, the monthly fee will again be reduced to 50%.

To further encourage cardholders to accrue higher savings balances, savings balances may be used to collateralize loans taken from cardholder credit accounts. Savings balances may be frozen until any loan balances are paid in full. In the event a cardholder goes delinquent on a credit account, card balances may be used to pay off delinquent credit balances first and then savings balance can be leveraged as repayment for any delinquent loan.

At least in some embodiments, automatic transfers cannot be established from the savings account 202 to fund the primary account 201. The customer may choose to transfer 206 any increment of their available savings balance from the savings account 202 to the primary account 201 by electing a one-time transfer option. The primary account 201 may not exceed the card value as defined by the cardholder terms and conditions in accordance with some embodiments. Similarly, there may be a maximum dollar limit on savings account 202 balances.

As required by Regulation D, the customer will only be allowed a maximum of six withdrawals from the savings account 202 per calendar month. If a cardholder requests a seventh withdrawal, the cardholder will be declined. The customer will be presented with a prompt that explains the requirement. The prompt will include their options for obtaining the funds, including: (1) close the savings account 202 and have all funds transferred 206 to the primary account 201 or (2) wait until it has been a complete calendar month to initiate a withdrawal. If the cardholders choose to close their savings account 202, they must wait 90 days to reopen as required by law. The cardholder can choose to close their savings account 202 at any time and reopen a new at any time, except where the account was closed as the result of exceeding the six withdrawal limitation (a Reg. D violation) and must wait 90 days. If the cardholders choose to close their primary account 201 account, the savings account 202 will automatically close and any savings account balances will be transferred to 206 the primary account 201. Any savings account 202 that has a $0 balance for 90 consecutive days may be closed. Additionally, a savings account 202 may be closed where a card does not have a consumer-initiated transaction for 90 consecutive days and the primary account 201 balance is less than $100. If the any interest is accrued during the period of account closure, the interest earned for the period will be forfeited.

U.S. tax laws and regulations require financial institutions to send a 1099-INT to account holders who earn interest on a financial account. In some embodiments, interest earned 255 on the stored-value card savings account 202 may be created and mailed by the sponsor bank annually. The interest calculation, accounting, and reporting may be executed by an interest accounting component 260. The interest accounting component may comprise a human, a computer processing unit, or other means of calculating interest and generating a report.

Interest payments 255 may be the first financial account and/or the second financial account at times designated by the bank, the stored-value card issuer, and/or the financial manager's desired parameters. For example, interest payments 255 may be paid on the savings account 202 balances quarterly, using the average daily balance (ADB) accrual method in accordance with at least in some embodiments. The ADB method applies a periodic rate to the ADB in the secondary account 202 for the quarterly statement cycle. The secondary account 202 may report 257 its daily principal balance to the interest accounting component 260. The ADB method adds the principal every day of the period and divides that figure by the number of days in the period. The period may be one calendar quarter and may be further defined as: Q1=January 1 through March 31; Q2=April 1 through June 30; Q3=July 1 through September 30; and Q4=October 1 through December 31. In some embodiments, interest may be posted six calendar days after the sixth calendar day of the quarter. The interest paid on the secondary account 202 balances may be calculated to three decimal places and rounded to the nearest penny. At least in some embodiments, the interest rate may be the current competitive market rate, as published thirty days prior to the quarterly period calculation. The cardholder may view the current rate and the APY on the cardholder website and/or the marketing materials from the card issuer or the account-sponsoring bank. If a cardholder closes the savings account 202 in the middle of the quarter, interest may be forfeited on the account.

At least in some embodiments, customer service agents may be able to effectively explain interest calculations and posting to the cardholder so that disputes may be resolved quickly. Customer service agents may also have the ability to perform the following options, after customer authentication: view savings terms and conditions, current rates, APYs, and interest payments; view account balances, transactions, transaction history; perform transfers to 205 and from 206 the savings account 202; schedule or change automatic transfers; and/or close the savings account 202.

At least in one embodiment, the reward 253 deposited to the primary account 201 may be directed to provide an incentive for the cardholder to purchase products or services from vendors associated with the card issuer. In some embodiments, the secondary account may offer features to allow cardholders to set a savings goal with a defined date or within a prescribed date range with a calculator to assist them with setting their goal. Cardholders may be able to define their goal, e.g., "vacation fund," "Christmas fund," "car fund," etc., with a web graphic that will easily demonstrate current balances compared to savings goals. In some embodiments, the card issuer or participating vendors may deposit reward 256 into the savings account 202 when the cardholder reaches his or her goal and/or when the account balance reaches a level determined by the card issuer or vendors.

In another embodiment, as indicated above and as would be understood regarding the linking of one primary account and one savings account, multiple primary accounts may be linked with a single savings account. Accordingly, in such an embodiment, the multiple primary accounts and the savings account would function/operate just as in the one-to-one linked embodiment, except that the interested parties may establish parameters and/or distribute allocations between the various accounts.

In another embodiment, as indicated above and as would be understood regarding the linking of one primary account and one savings account, multiple savings accounts may be linked with a single primary account. Accordingly, in such an embodiment, the primary account and the multiple savings accounts would function/operate just as in the one-to-one linked embodiment, except that the interested parties may establish parameters and/or distribute allocations between the various accounts.

In another embodiment, as indicated above and as would be understood regarding the linking of one primary account and one savings account, multiple primary accounts may be linked with multiple savings accounts. Accordingly, in such an embodiment, the multiple primary accounts and the multiple savings accounts would function/operate just as in the one-to-one linked embodiment, except that the interested parties may establish parameters and/or distribute allocations between the various accounts.

Figure 3:
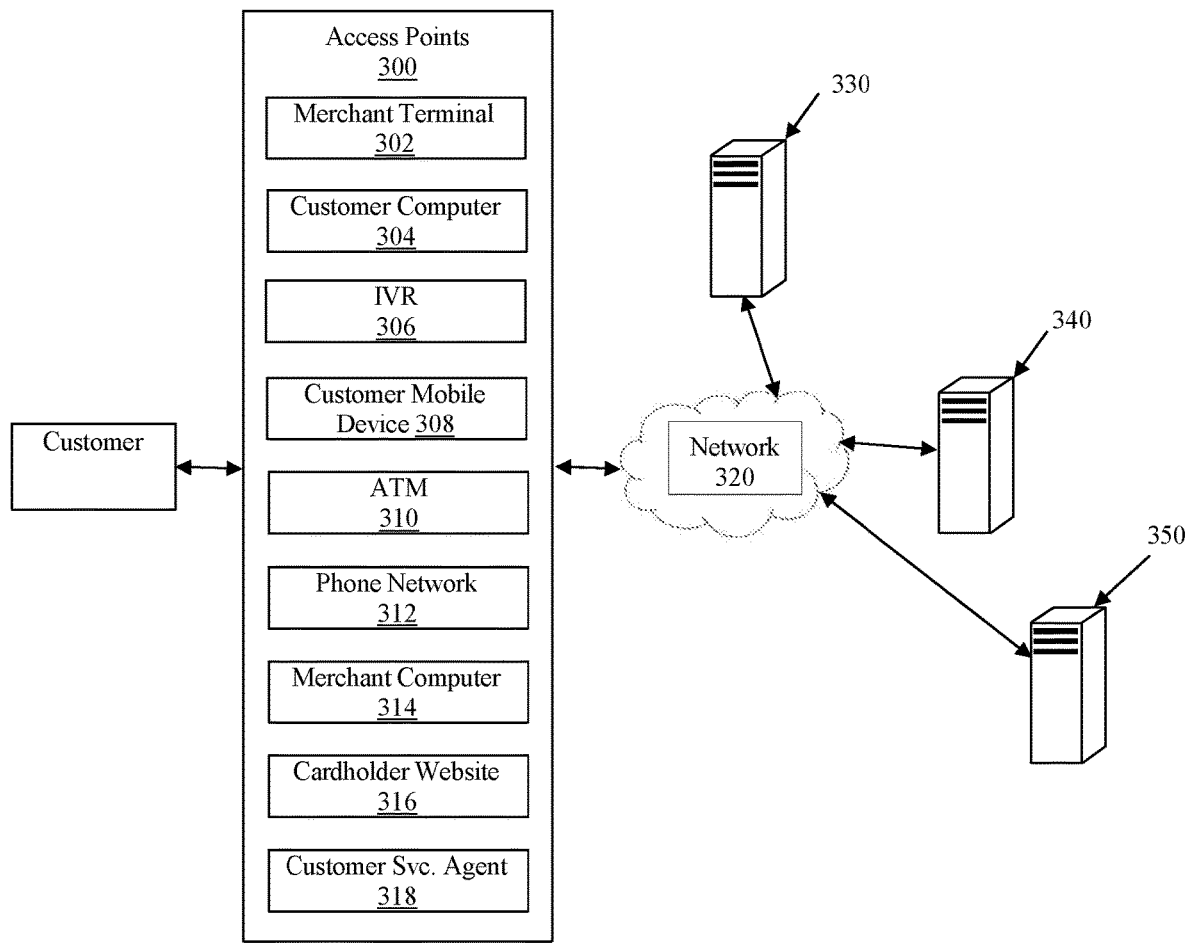
FIG. 3 illustrates a schematic representation of customer interaction with a stored-value card transaction system in accordance with at least some illustrated embodiments.

The account information and functionalities may be offered to cardholder through various access points. An access point is an interface through which the customer communicates with a stored-value card transaction system. FIG. 3 illustrates customer interaction to the stored-value card transaction system via access points 300. The access point 300 can be operated and/or owned by the customer or by the vendor (e.g., through a store clerk and/or pay station). Some examples of access points are a merchant POS terminal 302, a customer-owned computer 304, an interactive voice response (IVR) system 306, a customer-owned mobile device 308, an ATM 310, a phone network 312, a merchant-owned computer 314, a cardholder website 316 with online account management tools, or customer service agents 318. The embodiments and examples disclosed herein may refer to one of the access above methods. It is understood by one skilled in the art that substituting an alternative interface method is within the scope of this disclosure. For example, the cardholder may retrieve 204, 208 (FIG. 2) account balance reports for the primary 201 and secondary 202 accounts through the cardholder website, at an ATM, at a POS with appropriate equipment, or by calling a customer service representative.

Figure 4:
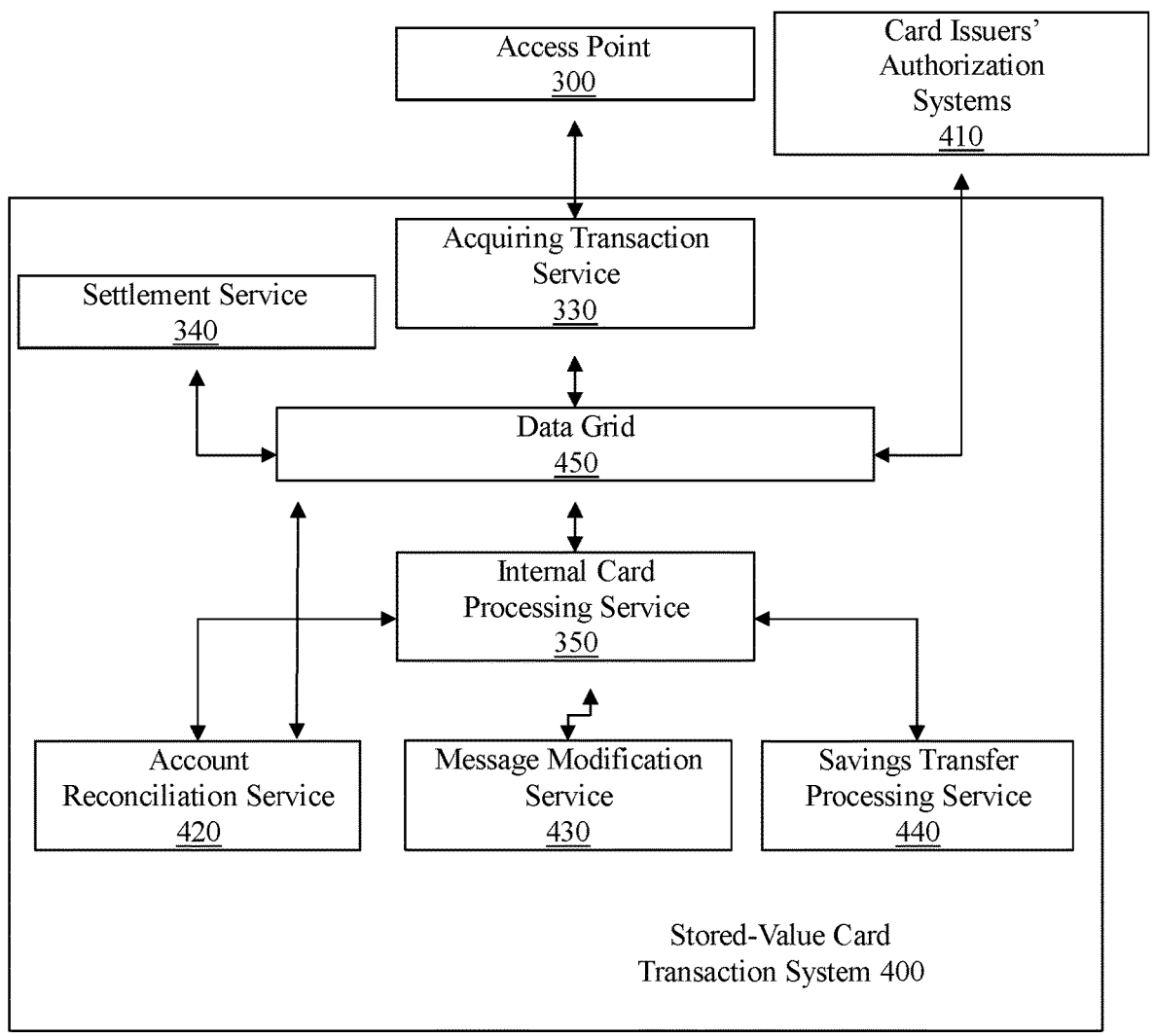
FIG. 4 illustrates a schematic view of various components of the stored-value card transaction system in accordance with at least some illustrated embodiments.

In at least one embodiment, a customer activates or replenishes a stored-value card at an access point 300. An access point 300 is sometimes called the front end because a customer interacts with the access point 300. The front end is coupled to the stored-value card transaction system (so called "back end") by a network 320. FIG. 4 illustrates a schematic view of various components of the stored-value card transaction system 400. In at least one embodiment, the network 320 is the Internet. Some other examples of networks 320 are a phone network, a wireless network, an intra-net network, a packet-switching network, etc. As illustrated, the back end comprises three servers or switches 330, 340, 350, each for a particular service, but services may be distributed or collected among the back-end hardware.

The acquiring transaction service 330 may function as a facilitator and is utilized to direct transaction requests and responses to the appropriate processors, services, and requesting entities. In at least one embodiment, the acquiring transaction service 330 is a switch. When a message is received at the acquiring transaction service 330, the acquiring transaction service 330 validates the formatting of the message. In other words, the acquiring transaction service 330 will check the data fields in the message to confirm that the field is populated with data and that the data is in the correct format (e.g., length, alphanumeric format). If the message is improperly formatted, the acquiring transaction service 330 will reject the transaction request. The transactions requests used as examples in this disclosure are predominantly activation requests and replenishment requests, but all other transaction requests, e.g., inquiry requests, deactivation requests, etc., are within the scope of this disclosure.

The acquiring transaction service 330 performs various validation checks on the transaction request. The acquiring transaction service 330 verifies card-related transaction information based on an analysis of several criteria, such as: (1) determining that the identification code for the product is present in the a data grid 450 for the stored-value card transaction system; (2) determining that the value amount of the requested transaction corresponds to the customer's payment for the subject request, e.g., whether the identification information identifies the card as a $25.00 card in the data grid 450 and that the corresponding transaction request includes a $25.00 payment by the customer; (3) determining that the identification information identifies the card as being a type of card available for processing by the requesting merchant in the data grid 450; and (4) determining that the Bank Identification Number (BIN) of the card (e.g., the first six digits of the card's identification number), which identifies the card issuer, corresponds to the identification information identifying the card issuer in the data grid 450.

The acquiring transaction service 330 may also reject transactions based on other criteria such as transaction velocity (number and/or amount per unit time). For example, if a card processor is concerned that multiple void transactions are indicative of fraudulent activity, the card processor could ask that the acquiring transaction service 330 monitor the number of void transactions requested and reject transactions from terminals that exceed a pre-selected amount of void transactions per unit time. Lastly, the acquiring transaction service 330 is configured to reject transaction requests in the event that the information received by the acquiring transaction service 330 is unintelligible.

If the message is properly formatted and is validated as described above, the acquiring transaction service 330 forwards the transaction information to the appropriate card processor, e.g., issuer, facilitator, merchant, and/or vendor. The card processor decides whether to reject the transaction request and/or perform the transaction request. The acquiring transaction service 330 will receive the transaction response from said processor (e.g., approval, denial, etc.) and direct the response to the source from which the acquiring transaction service 330 acquired the message.

The internal card processing service 350 is used to support activities as a stored-value card issuer, facilitator, and/or vendor. In at least one embodiment, the internal card processing service 350 is a server. The internal card processing service 350 processes card-related transactions based on an analysis of several criteria, including: (1) determining that no transaction was requested (e.g., balance inquiry) for the particular card prior to activation and that a preset amount of time (e.g., 30 minutes) has expired between activation and first attempt to redeem, either of which may be an indicator of fraudulent activity; (2) determining that the particular card has not already been activated; (3) determining that the card's identification number is present in the data grid 450; (4) determining that the particular card's expiration date matches the card's information contained in the data grid 450; (5) determining that the requested activation amount, e.g., $25.00, corresponds to the amount allowed for the requested card type (e.g., UPC information such as $25.00 Store X card) pursuant to the card-type's product specifications maintained in the data grid 450; (6) determining that the spending limit of the particular card has not been exceeded; and (7) determining that the particular card's security code transmitted in the transaction request corresponds to the security code assigned to the card as maintained in the data grid 450.

If one or more of the above-recited determinations is not affirmatively verified, the internal card processing service 350 will reject the requested transaction. If the internal card processing service 350 confirms that all of the above criteria are affirmatively met, the internal card processing service 350 will process the requested transaction and provide a transaction response (e.g., approval, denial, etc.) to the acquiring transaction service 330 for communication to access points 202 and vendors or card issuers via their own authorization systems 410.

The settlement service 340 reconciles transactions with card issuers and vendors. The settlement service 340 records transactions and outputs the transactions in files formatted for card issuer authorization systems 410. The settlement service 340 can use different protocols for different card issuers including different settlement frequencies, multiple cutoff times, settlement across products or by individual products, multi-party settlements, multi-currency settlements, complex fee and commission structures, and the reporting associated with each of the above.

In FIG. 4, one or more card issuers are represented by the card issuers' authorization systems 410, which are coupled to the stored-value card transaction system 400. The stored-value card transaction system 400 comprises an acquiring transaction service 330, a data grid 450, a settlement service 340, an internal card processing service 350, and may further comprise an account reconciliation service 420, a message modification service 430, and a saving transfer processing service 440. FIG. 4 illustrates just one example of out of many of how these services may be coupled. In at least one embodiment, the stored-value card transaction system 400 comprises an acquiring transaction service 330, an internal card processing service 350 coupled to the acquiring transaction service 330, and a settlement service 340 coupled to the internal card processing service 350. As shown, the various services are coupled through a data grid 450. The data grid 450 is a linearly scalable grid computing network. The acquiring transaction service 330 receives stored-value card transactions, and the internal card processing service 350 processes the stored-value card transactions. The settlement service 340 uses the data grid 450 for settlement of the stored-value card transactions. In at least one embodiment, the settlement service 340 settles the transaction on a real time or near real-time basis. Specifically, there is no intentional delay between processing the stored-value card transactions and settlement of the stored-value card transactions, i.e., the transactions are not "batch processed." Batch processing refers to introducing an intention delay between processing and settlement. As such, batch processing settles multiple transactions at once, perhaps when network traffic is not as dedicated to processing, but increases the risk of service level agreement (SLA) violations and settlement errors.

As opposed to batch processing, real time or near real-time processing allows transactions to be "trickle fed" to the settlement service 340, which leverages the data grid 450 to store and/or process transaction information. Furthermore, each entity associated with stored-value cards can adapt to changing conditions much faster using real time or near real-time settlement by responding to and adjusting various metrics. As such, large-scale failure is highly unlikely, and small failures only affect a minimal number of transactions before they are addressed.

In at least one embodiment, the acquiring transaction service 330 receives a stored-value card transaction request. For example, the request results from an access point 300 scan of a stored-value card's universal product code (UPC) and/or a swipe of the stored-value card's magnetic strip (such scenarios contemplate activation of the stored-value card by either a one-step or a two-step activation process as fully described in U.S. Pat. No. 7,607,574, which is incorporated by reference in its entirety). As such, the request is associated with a card identification number. For example, a bank identification number (BIN) is transmitted with the request, and the acquiring transaction service 330 transmits the BIN to the internal card processing service 350. The internal card processing service 350 determines card issuer associated with the stored-value card identification number. For example, the internal card processing service 350 queries a database that returns that the BIN is associated with card issuer X, and the internal card processing service 350 transmits this information to the acquiring transaction service 330. The acquiring transaction service 330 tailors each transaction request to the particular format of the card issuer, and sends the transaction request to the card issuer's authorization system 410. Confirmation of a successful execution of the transaction request is returned in at least one embodiment.

In at least another embodiment, the acquiring transaction service 330 receives a stored-value card transaction request. For example, the request results from an access point 300 scan of a stored-value card stored-value card's identification code and/or a swipe of the stored-value card stored-value card's magnetic strip. For example, a BIN is transmitted with the request, and the acquiring transaction service 330 transmits the BIN to the internal card processing service 350. The internal card processing service 350 determines card issuers associated with the stored-value card identification number. For example, the internal card processing service 350 queries a database that returns that the BIN is associated with a package of 5 gift cards, each backed by a different card issuer, and the internal card processing service 350 transmits this information to the acquiring transaction service 330. The acquiring transaction service 330 generates a plurality of children transaction requests based on the stored-value card transaction request, and sends at least one of the plurality of children transaction requests to a first card issuer, which is associated with at least one of the plurality of stored-value cards. The acquiring transaction service 330 sends at least another of the plurality of children transaction requests to a second card issuer 410, which is associated with at least one of the plurality of stored-value cards but is different from the first card issuer. For example, the acquiring transaction service 330 generates 5 children transaction requests, one for each card issuer, and each request is an activation request for a card issuer's particular card in the package. The acquiring transaction service 330 tailors each activation request to the particular format of the card issuer, and sends the activation requests to the each card issuers' authorization systems 410. Confirmation of successful executions of the activation requests are returned in at least one embodiment. As such, each of the 5 cards in the stored-value card package is activated via only one scan of the package's UPC and/or magnetic strip despite the different card issuer for each card.

The following will describe stored-value card uses and functionalities, especially reload or replenishment functionality in an open-loop stored-value card support context. It should be understood, however, that this is simply a matter of convenience and efficiency and that any genre of commercial applications of stored-value card usage is contemplated under this disclosure.

In at least one embodiment, the acquiring transaction service 330 receives a stored-value card activation request associated with a stored-value card. For example, a customer 102 wishes to replenish her already active stored-value card with funds, and selects a replenishing option on an access point 300 graphical user interface (GUI) at a vendor kiosk. However, it would be expensive to retrofit every access point 300 to send replenish requests rather than activation requests. As such, the back-end should be able to distinguish between activation requests intended for activation and activation requests intended for replenishment. In at least one embodiment, the acquiring transaction service 330 generates a replenish request, based on the stored-value card activation request, and sends the replenish request to the internal card processing service 350. For example, an account identifier, such as a BIN, is associated with the request. The internal card processing service 350 determines that the stored-value card is already active. If the card is already active, the activation request can be assumed to be intended for replenishment. If the card is not already active, the activation can be assumed to be intended for activation. At this point, either the acquiring transaction service 330 or the internal card processing service 350 can generate a second replenish request formatted for the card issuer system 410, or the stored-value card transaction system 400 can handle the replenish request internally. If the acquiring transaction service 330 generates the request, the internal card processing service 350 sends an identification number associated with the stored-value card to the acquiring transaction service 330 to associate with the request. In either case, the acquiring transaction service 330 sends a confirmation of successful execution of the stored-value card activation request upon successful execution of the replenish request. Because the access point 300 is not equipped for handling replenish requests, the access point 300 will also not be equipped for handling confirmation messages of successful execution of replenish requests. As such, confirmation of activation is sent instead.

In an alternative embodiment, the acquiring transaction service 330 determines that the internal card processing service issued the stored-value card. For example, Company Z contracts with a stored-value card processing company to issue the type of stored-value card used by the customer 102. As such, the internal card processing service 350, rather than Company Z's back-end 204, will store customer account information. Accordingly, the acquiring transaction service 330 sends a redemption request to the internal card processing service 350. In either case, the acquiring transaction service 330 sends a confirmation of successful execution of the stored-value card activation request upon successful execution of the replenish request.

In at least one embodiment, the acquiring transaction service 330 receives a stored-value card activation request associated with a stored-value card. For example, a customer 102 wishes to activate a stored-value card by entering a BIN onto a website using her computer 108. The acquiring transaction service 330 identifies the stored-value card as issued from the internal card processing service 350. The acquiring transaction service 330 sends a replenish request based on the stored-value card activation request, to the internal card processing service 350, similar to the process described above. However, the internal card processing service 350 sends a declination to the acquiring transaction service 330 in response to the replenish request because the stored-value card is not active. As such, the acquiring transaction service 330 sends an activation request, associated with the stored-value card, to the internal card processing service 350 in response. The internal card processing service 350 sends a confirmation of successful execution of the activation request to the acquiring transaction service 330 upon successful execution of the activation request. In at least one embodiment, the acquiring transaction service 330 forwards the confirmation to the access point 300 and vendor associated with the stored-value card.

In an embodiment wherein a stored-value card customer desires to redeem a stored-value card associated with variable reload/recharge/top-up functionality, the customer may interact with the stored-value card transaction system 400 via an interactive voice response IVR system 306 and/or another type of access point 300 (e.g., web portal, kiosk). The stored-value card will have an associated value, amount, and or denomination. For ease of discussion, the redemption scenario will be presented in the IVR system 306 context with the understanding that other access points 300 could be substituted for the IVR system 306 to achieve the same desired results.

To effectuate redemption of the stored-value card associated with variable reload/recharge/top-up functionality, the customer initiates communication with the stored-value card transaction system 400. For example, the customer calls a phone number associated with the IVR system 306 (said phone number is representative of stored-value card transaction system 400 communication information which is associated with the stored-value card and which the customer receives in conjunction with possession of the stored-value card). Upon initiating communication with the IVR system 110, the IVR system 306 prompts the customer to enter the identifying information intended for registration and association with the stored-value card. Upon receipt of the identifying information, the IVR system 306 validates the information (e.g., correct form, correct length, correct format for said information) and prompts the customer to enter a personal identification number (PIN) that is associated with the stored-value card (the PIN may be printed on the stored-value card, printed the stored-value card's packaging, and/or printed on a receipt concerning the stored-value card). The PIN may be any combination of alpha numeric characters, and/or symbols, for example, the PIN may comprise twelve numerals. Upon receipt of the PIN, the IVR system 306 transmits a redemption request to the internal card processing service 350. The internal card processing service 350 validates the PIN and ensures that the stored-value card is activated but has yet to be associated with a customer's device. The internal card processing service 350 generates a reload/recharge/top-up request and transmits said request to the acquiring transaction service 330. The reload/recharge/top-up request comprises the customer's identifying information and the stored-value card's associated value, amount, and/or denomination. The acquiring transaction service 330 transmits the request to a carrier associated with the stored-value card. The carrier applies the stored-value card's value, amount, and/or denomination to the customer's account and transmits a representative response to the acquiring transaction service 330. Upon receiving the representative response from the carrier, the acquiring transaction service 330 transmits the representative response to the internal card processing service 350. If the request is approved, the internal card processing service 350 associates the customer's identifying information with a customer account and/or the stored-value card's identification number. The customer account (or the stored-value card's associated value) is then set to zero balance. If the request is declined, the IVR system 306 notifies the customer with an error message received from the carrier and/or notifies the customer that the request will be processed in twenty-four hours. If approved, the IVR system 306 provides the customer with the carrier's name; identifying information; amount, value, and/or denomination of the stored-value card; and the customer account and/or the stored-value card's identification number. The IVR system 306 provides the customer with a notification that the customer's account has been successfully reloaded/recharged/topped-up. If any issues arise during this process, the customer is provided with information allowing the customer to contact the stored-value card transaction system's representatives for assistance.

In an embodiment wherein a stored-value card customer desires to reload/recharge/top-up a customer account, the acquiring transaction service 330 receives a request to activate a stored-value card associated with variable reload/recharge/top-up functionality. The request may be initiated from a POS terminal or other access point and includes and amount for said reload/recharge/top-up. The acquiring transaction service 330 identifies the card processor as internal card processing service 350. The acquiring transaction service 330 transmits the reload/recharge/top-up request to the internal card processing service 350.

In a first embodiment of the reload/recharge/top-up scenario, the internal card processing service 350 approves the request if the stored-value card is activated and associated with a customer account. The internal card processing service 350 determines the account and adds the requested reload/recharge/top-up amount to the account. The internal card processing service 350 sends a response to the request (e.g., indicating that the reload/recharge/top-up amount has been added to the associated account) to the acquiring transaction service 330. The acquiring transaction service 330 transmits a reload/recharge/top-up transaction request to account's associated carrier. Upon receiving approval of the reload/recharge/top-up transaction request from the carrier, the acquiring transaction service 330 transmits a redemption transaction to the internal card processing service 350. The internal card processing service 350 sets the account balance to zero and transmits an approval response to the acquiring transaction service 330. If the reload/recharge/top-up transaction request is not approved by the carrier, the acquiring transaction service 330 transmits a reversal request to the internal card processing service 350 which removes the requested reload/recharge/top-up amount from the account. The acquiring transaction service 330 transmits a reload/recharge/top-up transaction request response to the originating access point.

In another embodiment of the reload/recharge/top-up scenario, the internal card processing service 350 approves the request if the stored-value card is activated and associated with a customer account. The internal card processing service 350 transmits a reload/recharge/top-up transaction request to the acquiring transaction service 330. The acquiring transaction service 330 transmits the reload/recharge/top-up transaction request to the account's associated carrier. The acquiring transaction service 330 transmits the reload/recharge/top-up transaction request response to the internal card processing service 350. If the reload/recharge/top-up transaction request is approved by the carrier, the internal card processing service 350 transmits an approval message to the acquiring transaction service 330. If the reload/recharge/top-up transaction request is not approved by the carrier, the internal card processing service 350 transmits a rejection message to the acquiring transaction service 330. The acquiring transaction service 330 transmits the reload/recharge/top-up transaction request to the originating access point.

In at least one embodiment, the stored-value card transaction system 400 can process requests for transfer between the primary and the savings accounts. For example, when the cardholder submits a request for transfer from saving to the primary account at an access point 300 (e.g., cardholder website), the acquiring transaction service 330 sends a transfer request to the internal card processing service 350. The internal card processing service 350 compares the information with the savings transfer processing service to determine if (a) the savings account is active and has a positive, nonzero balance; (b) the savings account has sufficient balance to process the transfer request; (c) the savings account has had 5 or less transfers out of the account during the calendar month; and (d) the primary account balance has not exceeded the maximum value as defined by the cardholder terms and conditions. If the conditions are satisfactory, funds are transfer from the savings account to the primary account.

In an embodiment where the access point can only process activation/deactivation of a stored-value card, the request to transfer funds from the savings account to primary account may be transmitted as an activation request. The internal card processing service 350 determines whether the stored-value card is already active. If the card is already active, the activation request can be assumed to be intended for transfer to the primary account. At this point, either the acquiring transaction service 330 or the internal card processing service 350 can generate a second transfer request formatted for the card issuer system 410, or the stored-value card transaction system 400 can handle the transfer request internally. In either case, the acquiring transaction service 330 sends a confirmation of successful execution of the stored-value card activation request upon successful execution of the transfer request. Because the access point 300 is not equipped for handling transfer requests, the access point 300 will also not be equipped for handling confirmation messages of successful execution of transfer requests. As such, confirmation of activation is sent instead.

In some embodiments, a message modification component 430 may modify the activation messages to appropriate transaction confirmation messages. For example, if it is determined by the internal card processing service 350 that an account balance is insufficient fund the transfer request, an activation error message may be modified to a transfer denied message. In another example, if the transfer between savings and primary accounts is successful, then an activation message may be modified to a transfer confirmed message. Such messages can be transmitted to both the access point 300 to the cardholder and the card issuer authorization systems 410. In some embodiments, the message modification component 430 may communicate with both the internal processing service 350 as well as the savings transfer processing service 440 to relay a more accurate and detailed message to the cardholder. For example, if the savings transfer processing service 440 determines that the current request to transfer from the saving to the primary account is the seventh one of its kind in the current calendar month, an activation error message may be modified to a message indicating that the current transfer is a Reg. D violation. The message modification component 430 may prompt the cardholder that proceeding with the transfer would result in closing of the savings account where all savings balance will be transfer to the primary account. The message medication component may further warn the cardholder that such transaction would place a 90-day hold before the cardholder can open another savings account.

In some embodiments, the account reconciliation service 420 may operate in conjunction with the savings transfer processing service 440 component to reconcile any issues among the primary and secondary savings accounts. For example, if primary account 201 balance is negative for at least 90 consecutive days, all balances held in the savings account 202 can be used to offset any negative primary account 201. The account reconciliation services may automatically initiate this transaction without the cardholder's request or authorization under the terms and conditions of the stored-value card accounts. In another example, the account reconciliation service 420 may close any savings account that has a zero balance for 90 consecutive days. Still another example may be where the account reconciliation service 420 closes any savings account where the cardholder has not initiated any transactions for 90 consecutive days and the primary account 201 balance is less than $100.

In at least one embodiment, a linearly scalable grid computing network is used for settlement of stored-value card transactions. The linearly scalable grid computing network comprises a plurality of different architectural components. These components comprise: a data grid with various spaces therein; a database; a set of application programming interfaces (APIs) allowing for data grid access; real-time processes; a data manager; and container wherein reside certain real-time processes, the data manager, the set of APIs allowing for data grid access, and the data grid. Ultimately, the linearly scalable grid computing network allows for more efficient and higher volumes of transaction processes (e.g., 200 transactions per second, four million transactions per every six hours).

Real time (or near real time) processes are responsible connecting to various data sources, acquiring transactions from the data sources, data validation, fee calculations and inserting information into a settlement database. Certain of these real time processes comprise processes for connecting the linearly scalable grid computing network to differing data sources (e.g., different transaction processing switches and/or platforms). Other of these real time processes comprise processes for inserting transaction data into temporary data tables allowing for faster data access. Other of these real time processes comprise processes (e.g., based on bit map value) for continuously querying certain data tables (e.g., temporary data tables), applying business logic and updating data tables with results along with updated bitmap. Other of these real time processes comprise processes for inserting transaction information into one table while removing the transactions from another table (e.g., inserting transaction information into a permanent table and removing the transaction from a temporary table).

The linearly scalable grid computing network allows for all transactional data to be stored in a memory grid for faster data retrieval and update. The grid is partitioned with redundancy and fail over support. Support is added to all real time processes to enable the real time processes to be deployed as services by which multiple instances of the same real time process can be deployed and managed. These multiple instances of the real time processes may read data in data spaces, perform business logic, and update data in the data spaces.

Specifically, three data spaces are contemplated. These three data spaces comprise Transaction Data Space, Master Data Space, and Summary Data Space. Transaction Data Space is the data space for transaction data. Master Data Space is the data space for master data, which is reference data and will be updated periodically by certain of the multiple instances of the real time processes. Summary Data Space is the data space for summary data that may be used by batch processes.

Figure 5:
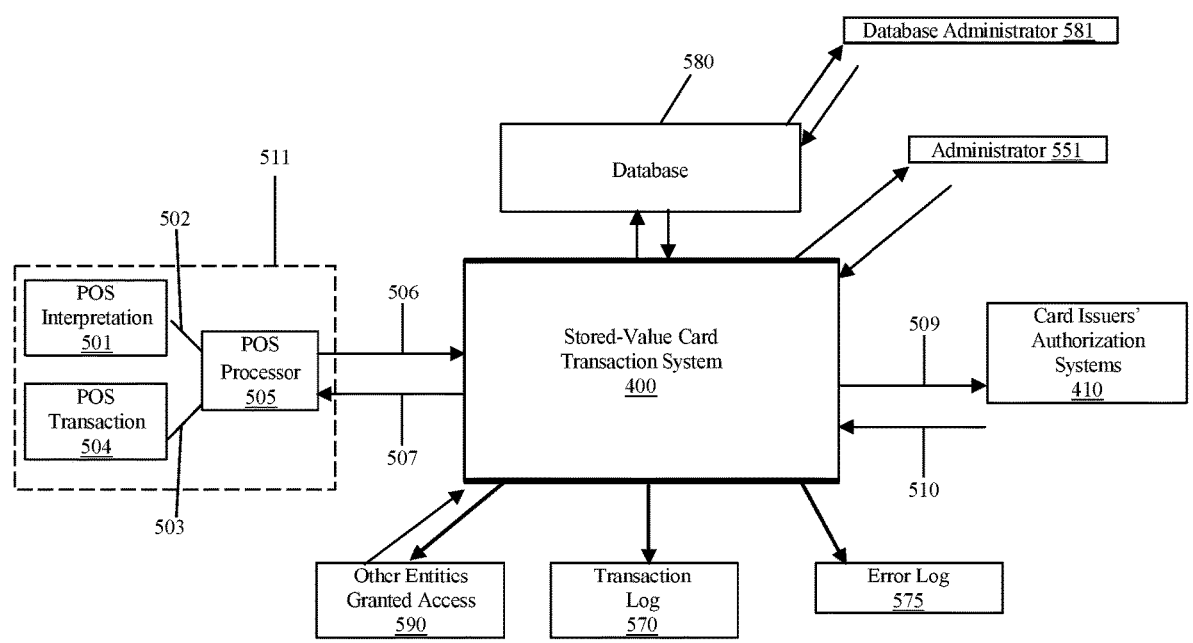
FIG. 5 illustrates a stored-value card transaction system coupled to various other components in accordance with at least some illustrated embodiments.

FIG. 5 illustrates a stored-value card transaction system 400 coupled to various other components. FIG. 5 includes: (a) a stored-value card transaction system 400; (b) at least one point of sale (POS) component 511; (c) a database 580 of stored-value card identifiers and individual stored-value card identifiers; (d) at least one individual card issuer's authorization system 410; and (e) any other component included in the system by the stored-value card transaction system administrator 551. The system is adapted to respond to various stored-value card request transactions, with each of the stored-value cards and/or stored-value card packages bearing unique identifiers.

As can be seen in FIG. 5, at the POS, the various identifiers are interpreted 502 by a POS interpretation component 501. The POS interpretation component 501 can comprise a human, a bar code scanner, magnetic strip reader, optical character recognition device, or other device configured to interpret the data encoded in the various identifiers. Contemporaneously with the interpretation 502 of the identifier, a request 503 for transaction by a POS transaction component 504 is made. The POS transaction component 504 can comprise a human, an electronic input device, a register, a CPU, or other means of requesting the transaction on the stored-value card identifier interpreted 502 by the POS interpretation component 501. Transaction request 503 may include request for activation, deactivation, reload, payment, etc. For purposes of disclosure, the actions performed by the POS interpretation component 501 and the POS transaction component 504 may be performed by one component capable of performing both actions that would be performed by the individual components.

The POS interpretation component 501 and the POS transaction component 504 communicate with the POS processing component 505. The POS processing component 505 can comprise a CPU or other type of processing device accepted for use in the industry. The POS interpretation component 501 communicates the identifier to the POS processing component 505. The POS transaction component 504 communicates the request 503 for transaction on the stored-value card identifier interpreted 502 by the POS interpretation component 501 to the POS processing component 505. The POS processing component 505 correlates the identifier interpreted by the POS interpretation component 501 with the request for transaction made by the POS transaction component 504 and communicates the request 506 for transaction to the stored-value card transaction system 400. For purposes of disclosure, the actions performed by the POS interpretation component 501, the POS transaction component 504, and the POS processing component 511 may all be performed by one component capable of performing all the actions that would be performed by the individual components.

The POS processing component 505 is connectable to the stored-value card transaction system 400 via a suitable network, such as a public switched telephone network (PSTN) or an independent dedicated network. Each POS processing component 505 has an associated identifier that may be transmitted to the stored-value card transaction system 400 during the course of connecting the POS processing component 505 to the stored-value card transaction system 400.

As depicted in FIG. 5, the stored-value card transaction system 400 is configured to: (a) form a secure connection with the card vendor system, the card issuers' authorization systems 410, and any other entities authorized to access 590 the stored-value card transaction system 400 by the stored-value card transaction system administrator 551; (b) access the database 580 to determine the stored-value cards to be transacted on based on the identifier communicated to it by the card vendor; (c) to communicate with card issuers' authorization systems 410 to request and receive transaction on specific stored-value cards based on the information contained in the database 580 correlating stored-value card identifiers to unique stored-value card identifiers; (d) generate and maintain transaction log 570 of all activities performed; (e) generate and maintain an error log 575 of all activities unsuccessfully completed and reasons therefor; (f) communicate to the card vendor the transaction on the individual stored-value cards and any information concomitant with the transaction on individual stored-value cards (e.g., confirmation of approval); and (g) communicate to the card vendor any reasons why requested transactions cannot not be completed.

The stored-value card transaction system administrator 551 may perform the oversight and maintenance of the stored-value card transaction system. Although not required, in an alternative embodiment, the stored-value card transaction system administrator 551 may also function as the database administrator 581.

The stored-value card transaction system 400 may comprise a singular processing unit (e.g., centralized server or data center), a plurality of processing units (e.g., a distributed computing system with various components distributed and in communication with each other), or a combination thereof, with concomitant storage capability, capable of accessing the database 580, creating and maintaining a transaction log 570, creating and maintaining an error log 575, communicating with the card vendor, communicating with the individual card issuers' authorization systems 410, processing individual stored-value card transaction requests, and communicating with other systems 590 capable of and authorized to communicate with the stored-value card transaction system 400.

Database 580 maintains record of accounts associated with each stored-value card indicating: (a) whether each individual card has been activated or deactivated; (b) whether the card has one or more associated savings account; (c) records and details of each individual account; (d) the balance of primary and secondary savings account; (e) conditions required for transactions between the accounts; (f) identity of the card issuer and account-sponsor bank; (g) conditions for automatic transfers; and/or (h) any combination thereof. The database 580 may also maintain records of conditions required for granting transactions to the savings account associated with stored-value card.

In the alternative, the stored-value card transaction system may comprise a plurality of processing units, with concomitant storage capabilities, each capable of: the services described above and in FIG. 5, accessing the database 580; creating a transaction log 570; creating and maintaining an error log 575; communicating with card vendors; communicating with the individual card issuers' authorization systems 410; processing individual stored-value card transaction requests; and communicating with other systems 590 capable of and authorized to communicate with the stored-value card transaction system 400.

In another alternative embodiment, the stored-value card transaction system 400 may comprise a plurality of processing units, with concomitant storage capabilities, each individually designated for: the services described above and in FIG. 5, accessing the database 580; creating a transaction log 570; creating and maintaining an error log 575; communicating with card vendors; communicating with the individual card issuers' authorization systems 410; processing individual stored-value card transaction requests; and communicating with other systems 590 capable of and authorized to communicate with the stored-value card transaction system 400.

In another alternative embodiment, the stored-value card transaction system may comprise a plurality of processing units, with concomitant storage capabilities: capable of the services described above and in FIG. 5, accessing the database 580, creating a transaction log 570, creating and maintaining an error log 575, communicating with card vendors, communicating with the individual card issuers' authorization systems 410, processing individual stored-value card transaction requests, and communicating with other systems 590 capable of and authorized to communicate with the stored-value card transaction system 400; designated for accessing the database 580, designated for creating a transaction log 570, designated for creating and maintaining an error log 575, designated for communicating with card vendors, designated for communicating with the individual card issuers' authorization systems 410, designated for processing individual stored-value card transaction requests, and designated for communicating with other systems 590 capable of and authorized to communicate with the stored-value card transaction system 400; or any combination thereof.

Upon receipt of a transaction request, if the received identifier is a stored-value card identifier, the stored-value card transaction system 400 accesses the database 580 of stored-value card identifier data correlated to unique stored-value card identifiers. The stored-value card transaction system 400 processes the information (and if necessary for a stored-value card identifier, processes the information along with information contained in the database 580) and communicates 509, 510 with the individual card issuer['s'] authorization system[s] 360 to effectuate transaction on the stored-value card[s] of the request. The stored-value card transaction system's 400 communication with the individual card issuers' authorization systems 410 may occur simultaneously or independently. The stored-value card transaction system 400 is connectable to the individual card issuers' authorization systems as via a suitable network, such as the PSTN or an independent dedicated network. The stored-value card transaction system 400 is configured to receive communication from the card issuers' authorization systems 410 concerning the status of the transaction on individual stored-value cards.

The stored-value card transaction system 400 is also configured to generate and maintain a transaction log 570 of all activity involving the stored-value card transaction computer 400. The transaction log may comprise a detailed summary of: (a) requested stored-value card activations; (b) requested stored-value card deactivations; (c) the monetary amount ascribed to stored-value card activations; (d) the monetary amount ascribed to stored-value card deactivations; (e) the monetary amounts ascribed individual primary accounts; (h) the monetary amounts ascribed to individual secondary savings accounts; (i) the identities of the individual card issuers of the stored-value cards; (j) the identities of the individual account-sponsoring bank; (k) the time the stored-value cards were activated; (l) the time the stored-value cards were deactivated; (m) the time individual savings account were activated; (n) the time individual automatic transfers to savings accounts were deactivated; (o) the transaction or communication performed with the card issuer to transfer to the savings account; (p) the transaction or communication performed with the card issuer to transfer from the savings account; (q) the PIN communicated to the card vendor in response to a request to activate a stored-value card requiring the input of a PIN for use; (r) any other information the stored-value card transaction system administrator 551 directs the stored-value card transaction system 400 to maintain as a log entry; (s) interests accrued on the savings accounts; and (t) any combination thereof.

The information contained in the transaction log 570 may be used to generate reconciliation reports, settlement reports, payment reports, audit reports, or other forms of information aggregation for the benefit of, use by, or for provision to, the stored-value card transaction administrator 551, the database administrator 581, card vendors, card issuers, card issuer's authorization systems 410, redeeming merchants, or other interested parties. The stored-value card transaction system 400 is configured to generate and maintain an error log of all transactions that were not completed and reasons therefor.

The stored-value card transaction system 400 is also configured to communicate to the card vendor 307 the status of a request for activation or deactivation of a stored-value card identifier and/or individual stored-value cards and to communicate any necessary PIN information required by activated stored-value cards to the card vendor in order for the card purchaser to be apprised of that information for use of the purchased individual stored-value card. As previously discussed, is connectable to the individual card issuers' authorization systems as via a suitable network, such as the PSTN or an independent dedicated network.

The stored-value card transaction system 400 is also configured to communicate with other entities 590 authorized to access the stored-value card transaction system and specifically authorized to access the stored-value card transaction system 400. These other entities may comprise third-party payment management systems, third-party audit systems, card issuer affiliated entities, card vendor affiliated entities, redeeming merchants or redeeming merchant affiliated entities, or any other entity provided access by the stored-value card transaction system administrator 551.

In at least one embodiment, there may arise situations where an activation or deactivation request is received by the stored-value card transaction system 400, but the information in the database 580 pertaining to the stored-value card identifier or the individual stored-value card identifiers received by stored-value card activation computer 400 precludes completion of the request. For example, a stored-value card assembly or individual stored-value card may have been previously activated, returned to the POS for a refund, but not deactivated prior to reshelving. In that case, when subsequent customer purchases that package assembly or individual stored-value card, and an activation request is communicated to the stored-value card transaction system 400, the database 580 file accessed by the stored-value card transaction system 400 will indicate that the package assembly, the individual stored-value cards secured by the package, or the individual stored-value card are already activated. In this and other similar situations, the stored-value card transaction system will communicate a message to the card vendor that the transaction cannot be completed.

Figure 6:
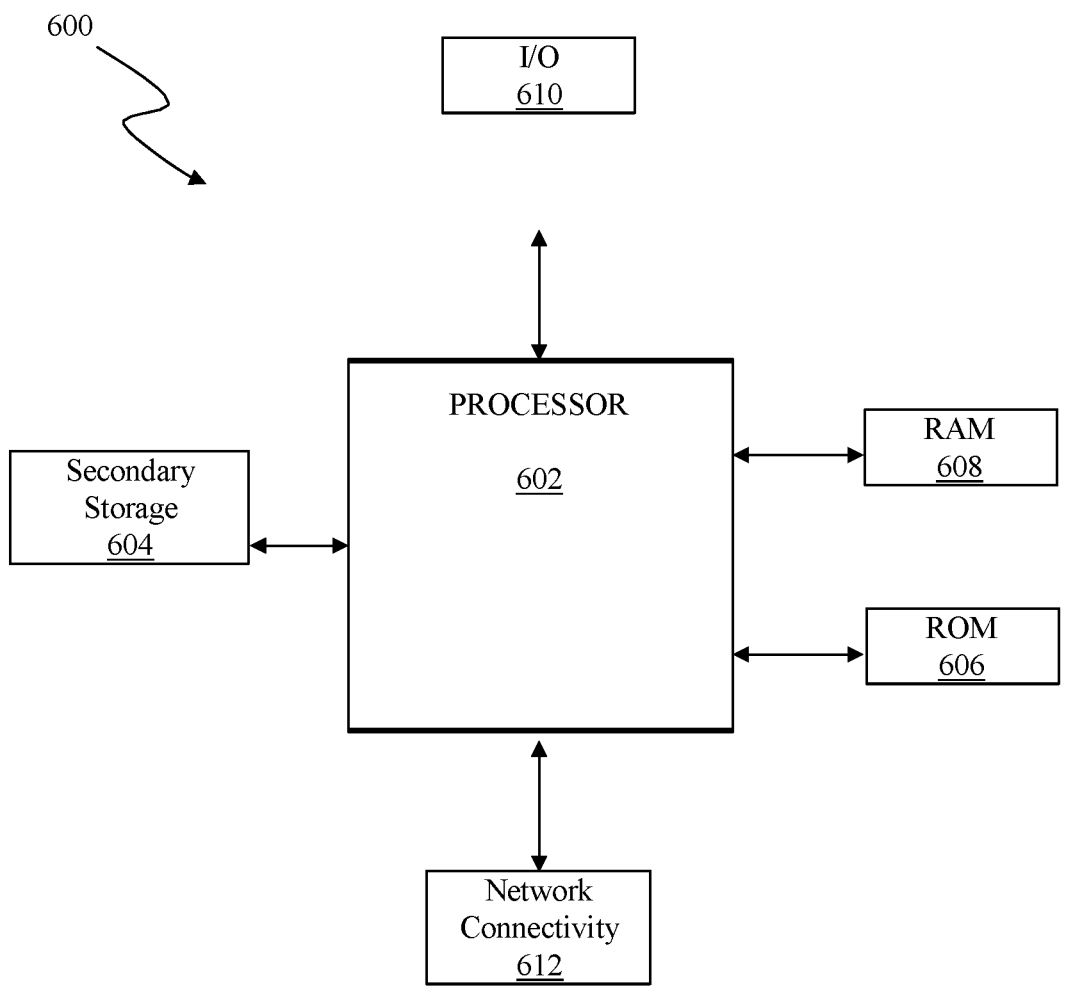
FIG. 6 illustrates a machine suitable for implementing at least some illustrated embodiments of stored-value card transaction system.

The stored-value card transaction system 400 above or specific services may be implemented on any general purpose computer with sufficient processing power, memory resources, and network throughput capability to handle the necessary workload placed upon it. The machine may host one or more services or be part of a group of machines hosting one or more services collectively. FIG. 6 illustrates a particular machine suitable for implementing one or more embodiments or services disclosed herein. The computer system 600 includes a processor 602 (which may be referred to as a central processor unit or CPU) that is in communication with memory devices including secondary storage 604, read only memory (ROM) 606, random access memory (RAM) 608, input/output (I/O) 610 devices, and network connectivity devices 612. The processor may be implemented as one or more CPU chips.

It is understood that by programming and/or loading executable instructions onto the computer system 600, at lease one of the CPU 602, the RAM 608, and the ROM 606 are changed, transforming the computer system 600 in part to a particular machine or apparatus having novel functionalities taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinges on consideration of stability of the design and numbers of units to be produced rather than any issues involved in translating from the software domain to the hardware domain. Generally, a design that is still subject to frequent change may be preferred to be implements in software because re-spinning a hardware implementation is more expensive than re-spinning a software design. Generally, a design that is stable that will be produced in large volume may be preferred to be implements in hardware, for example in an application specific integrated circuit (ASIC), because for large production runs the hardware implementation may be less expensive than software implementation. Often a design may be developed and tested in a software form and later transformed, by well-known design rules, to an equivalent hardware implementation in an application-specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 604 is, in at least one embodiment, is typically comprised of one or more disk drives or tape drives and is used for non-volatile storage of data and as an over-flow data storage device if RAM 388 is not large enough to hold all working data. Secondary storage 604 may be used to store programs, which may be loaded into RAM 388 when such programs are selected for execution. The ROM 606 is used to store instructions and perhaps data, which may be read during program execution. ROM 606 is a non-volatile memory device that, in at least one embodiment, has a small memory capacity relative to the larger memory capacity of secondary storage. The RAM 608 is used to store volatile data and perhaps to store instructions. Access to both ROM 606 and RAM 608 is faster than to secondary storage 604 in at least one embodiment.

I/O 610 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 612 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 612 devices may enable the processor 602 to communicate with an Internet or one or more intranets. With such a network connection, it is contemplated that the processor 602 might receive information from the network, or might output information to the network in the course of performing the above-described method steps. Such information, which is often represented as a sequence of instructions to be executed using processor 602, may be received from and outputted to the network, for example, in the form of a computer data signal embodied in a carrier wave Such information, which may include data or instructions to be executed using processor 602 for example, may be received from and outputted to the network, for example, in the form of a computer data baseband signal or signal embodied in a carrier wave. The baseband signal or signal embodied in the carrier wave generated by the network connectivity 612 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 602 executes instructions, codes, computer programs, scripts which it accesses from hard disk, floppy disk, optical disk (these various disk based systems may all be considered secondary storage 604), ROM 606, RAM 608, or the network connectivity devices 612.

Figure 7:
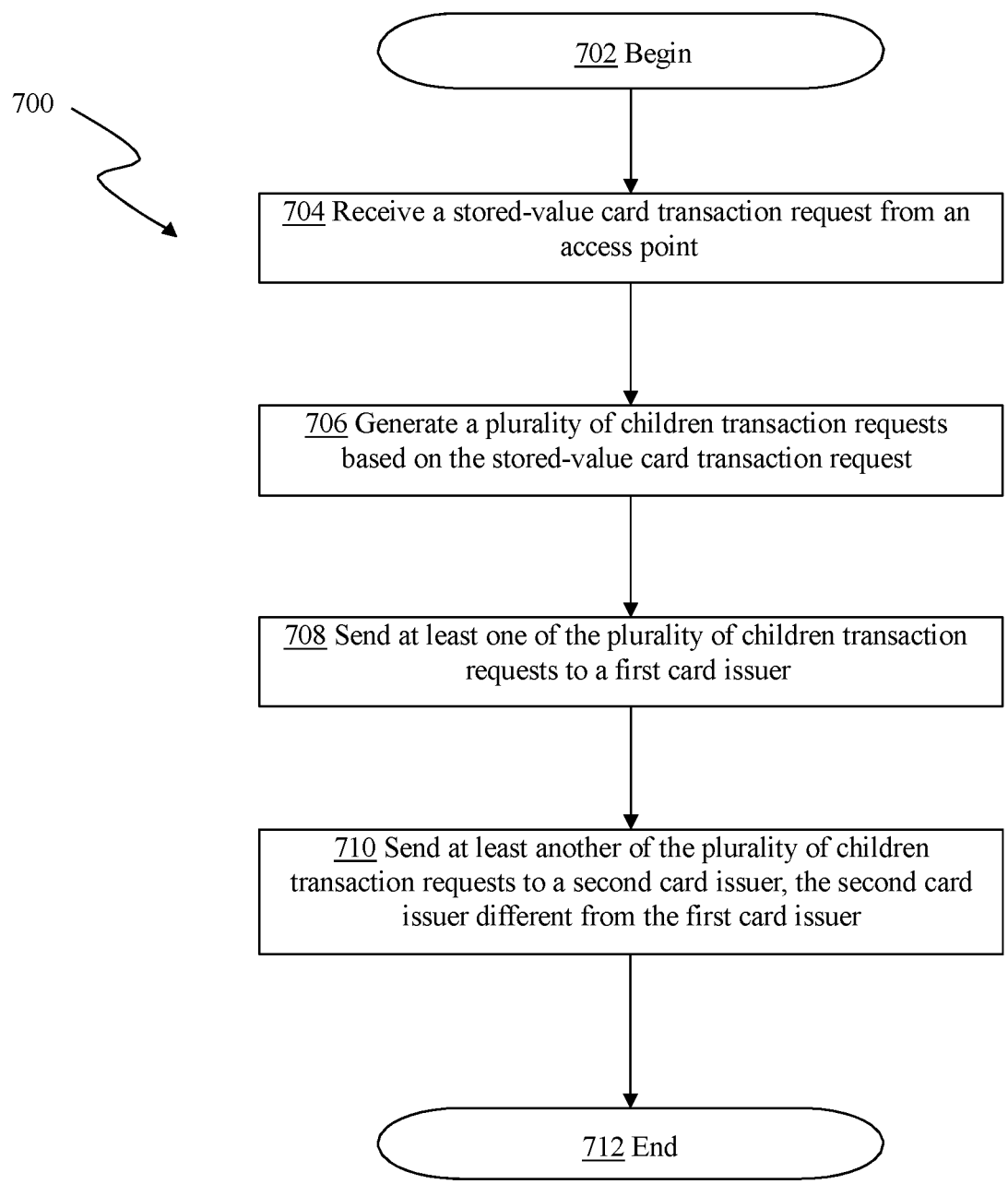
FIG. 7 illustrates a method of generating and transmitting children transactions on stored-value cards in accordance with at least some illustrated embodiments.

FIGS. 7-10 illustrate various methods for efficient stored-value card transactions. Any step taken by any entity or service described above or in FIGS. 1-4 may be taken from or included in the particular embodiments represented by FIGS. 7-10. FIG. 7 illustrates a method 700 beginning at 702 and ending at 712. At 704, a stored-value card transaction request is received from an access point. Some examples of access points are merchant terminal, customer computer coupled to the Internet, interactive voice response server, customer mobile device coupled to Internet, or customer mobile device coupled to short messaging service (SMS). The stored-value card transaction request may comprise an individual stored-value card identification number or indicia thereof or, alternatively, may comprise a package identification number, wherein the package identification number is associated with a plurality of stored-value cards. At 706, a plurality of children transaction requests are generated based on the stored-value card transaction request.

In at least one embodiment, a transaction request comprising an individual card identification number or indicia thereof may result in number of children transaction requests. At 708, at least one of the plurality of children transaction requests is sent to a first card party. At 710, at least another of the plurality of children transaction requests is sent to a second card party.

In at least one embodiment, a number of children transaction requests in the plurality of children transaction requests is equal to a number of stored-value cards in the plurality of stored-value cards. At 708, at least one of the plurality of children transaction requests is sent to a first card party. The first card party is associated with at least one of the plurality of stored-value cards. At 710, at least another of the plurality of children transaction requests is sent to a second card party. The second card party is different from the first card party, and the second card party is associated with at least one of the plurality of stored-value cards.

Figure 8:
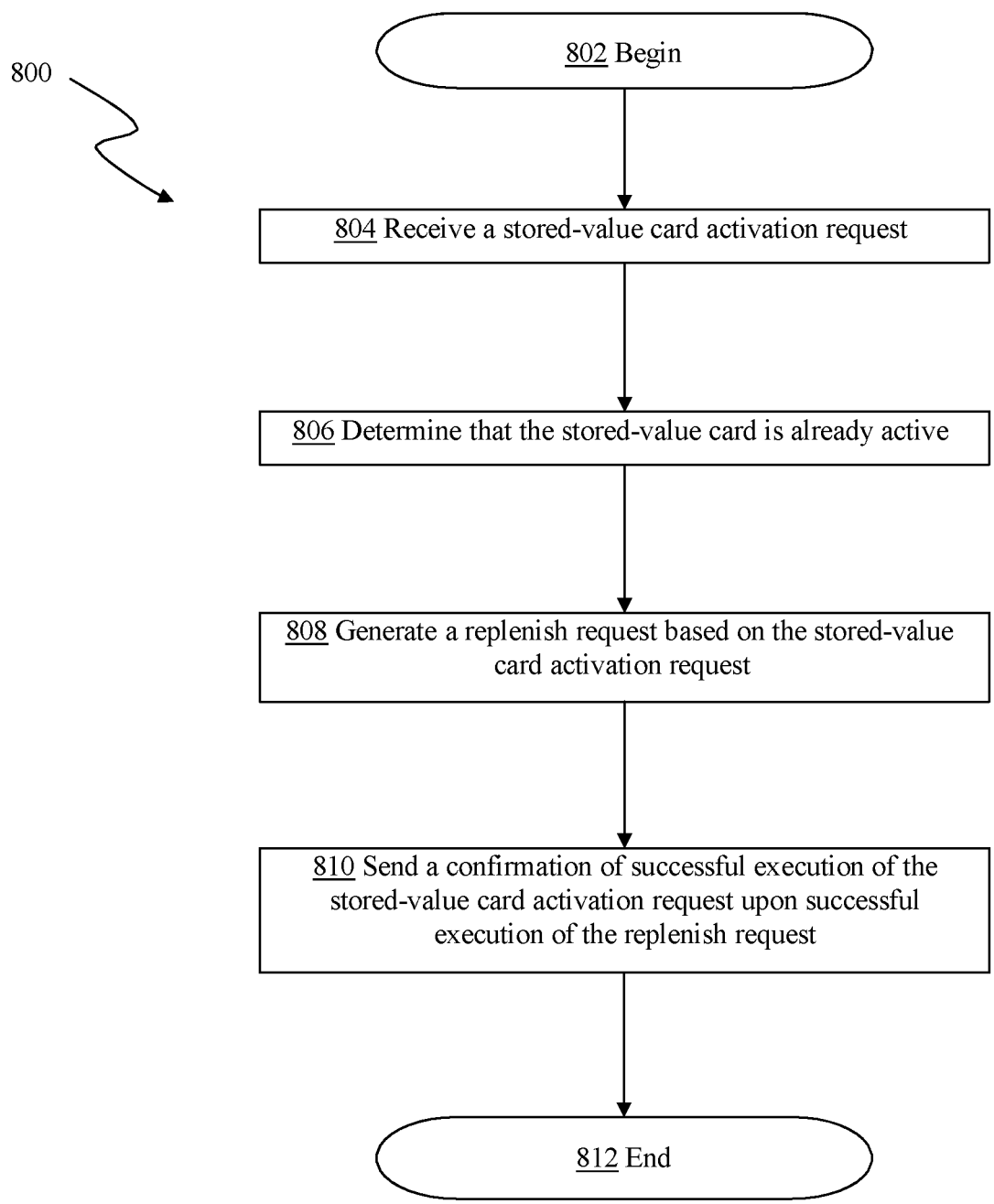
FIG. 8 illustrates a method of replenishing stored-value cards in accordance with at least some illustrated embodiments.

FIG. 8 illustrates a method 800 beginning at 802 and ending at 812. At 804, a stored-value card activation request associated with a stored-value card is received. In at least one embodiment, the method 800 comprises determining that an internal card processing service issued the stored-value card. At 806, a determination is made that the stored-value card is already active. For example, if a phone number is associated with the stored-value card, the card can be assumed to be active. Also, activation of the stored-value card may be attempted. Depending on any returned activation error code, the card may be assumed to be active. At 808, a replenish request is generated based on the stored-value card activation request. For example, if the activation request fails because the card is already active, the activation request may be assumed to have been generated with the intention of replenishment. In at least one embodiment, the replenishment request is executed. At 810, a confirmation of successful execution of the stored-value card activation request is sent upon successful execution of the replenish request.

Figure 9:
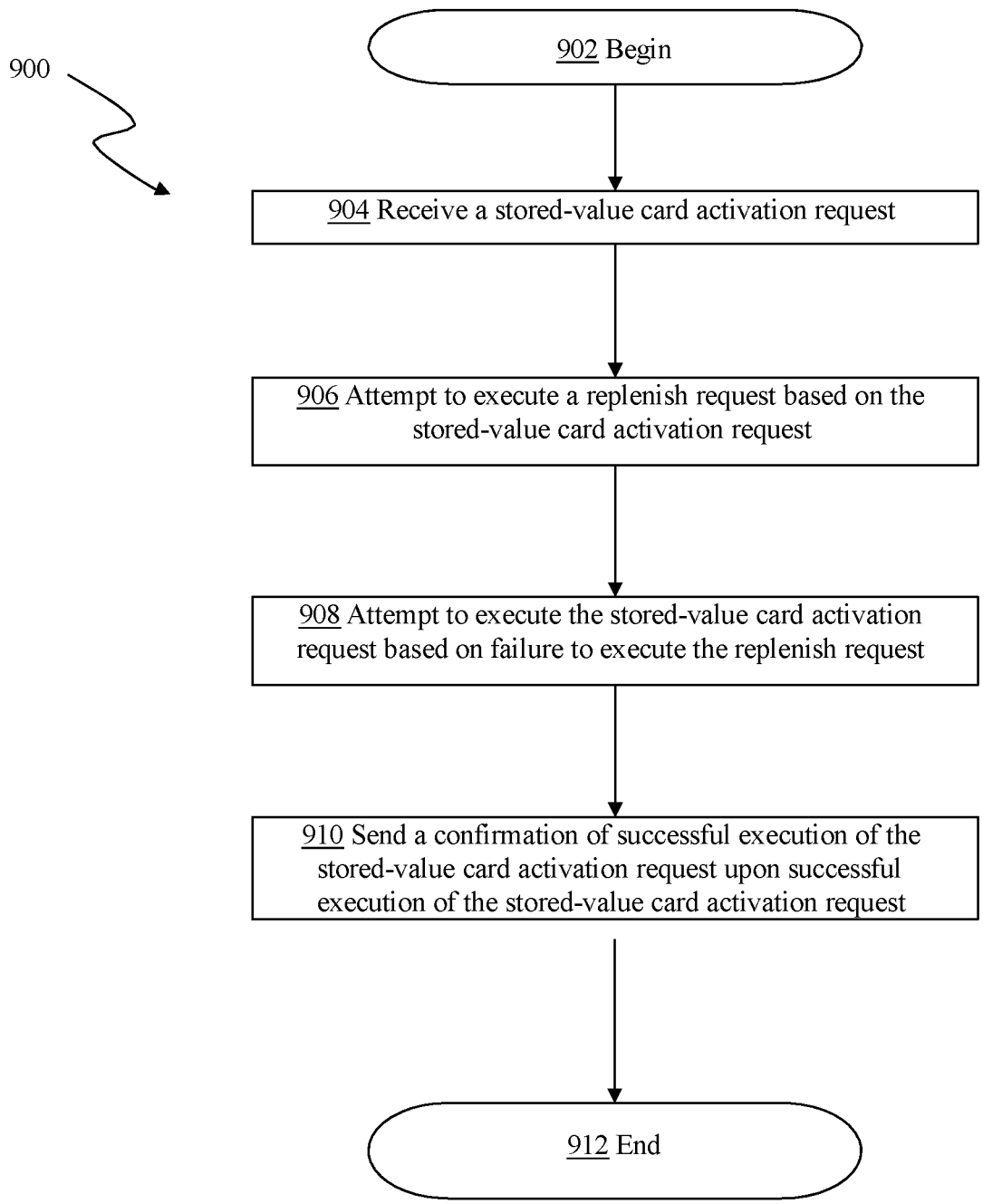
FIG. 9 illustrates a method of replenishing stored-value cards in accordance with at least some illustrated embodiments.

FIG. 9 illustrates a method 900 beginning at 902 and ending at 912. At 904, a stored-value card activation request associated with a stored-value card is received. At 906, an attempt is made to initiate or execute a replenish request based on the stored-value card activation request. Failure to execute the replenish request is caused by the stored-value card being inactive in at least one embodiment. At 908, an attempt is made to initiate or execute the stored-value card activation request based on failure to execute the replenish request. In at least one embodiment, the activation request is executed. At 910, a confirmation of successful execution of the stored-value card activation request is sent upon successful execution of the stored-value card activation request.

Figure 10:
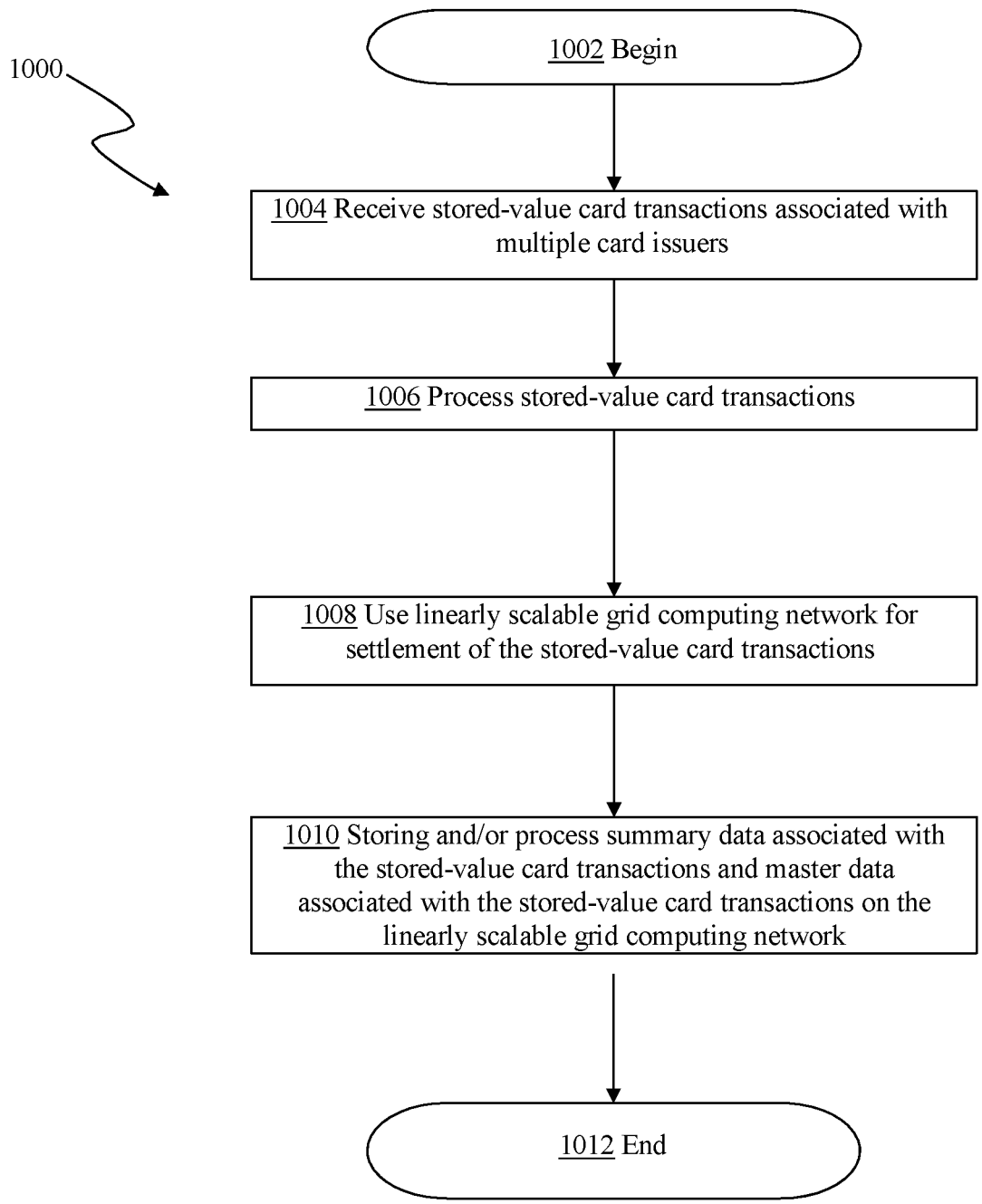
FIG. 10 illustrates a method of processing multiple stored-value card transactions using a linearly scalable grid computing network in accordance with at least some illustrated embodiments.

FIG. 10 illustrates a method 1000 beginning at 1002 and ending at 1012. At 1004, stored-value card transactions are received. The stored-value card transactions are associated with multiple card issuers. At 1006, the stored-value card transactions are processed. If a volume of stored-value card transactions falls below a threshold, a node is added to the linearly scalable grid computing network. For example, another server or switch is made part of a group of servers or switches that are assigned transaction responsibilities or services. If the volume of stored-value card transactions exceeds a threshold, a node is removed from the linearly scalable grid computing network. In other words, the server or switch is rezoned. For example, another server or switch is removed from a group of servers or switches that are assigned transaction responsibilities or services. In other words, the server or switch is rezoned.

At 1008, a linearly scalable grid computing network is used for settlement of the stored-value card transactions. In at least one embodiment, using the linearly scalable grid computing network comprises storing and/or processing transaction data associated with the stored-value card transactions on the linearly scalable grid computing network. In various embodiments, at 1010, using the linearly scalable grid computing network also comprises storing and/or processing summary data associated with the stored-value card transactions, and storing and/or processing master data associated with the stored-value card transactions on the linearly scalable grid computing network. By leveraging data grid, bottlenecks and errors resulting from slow access to a database is prevented. Rather, the data stored on the data grid is asynchronously stored to a database. As such, batch processing can be avoided, but a reference database is still maintained. There is no intentional delay between processing the stored-value card transactions and settlement of the stored-value card transactions and the transactions are settled in real time or near real time.

Figure 11:
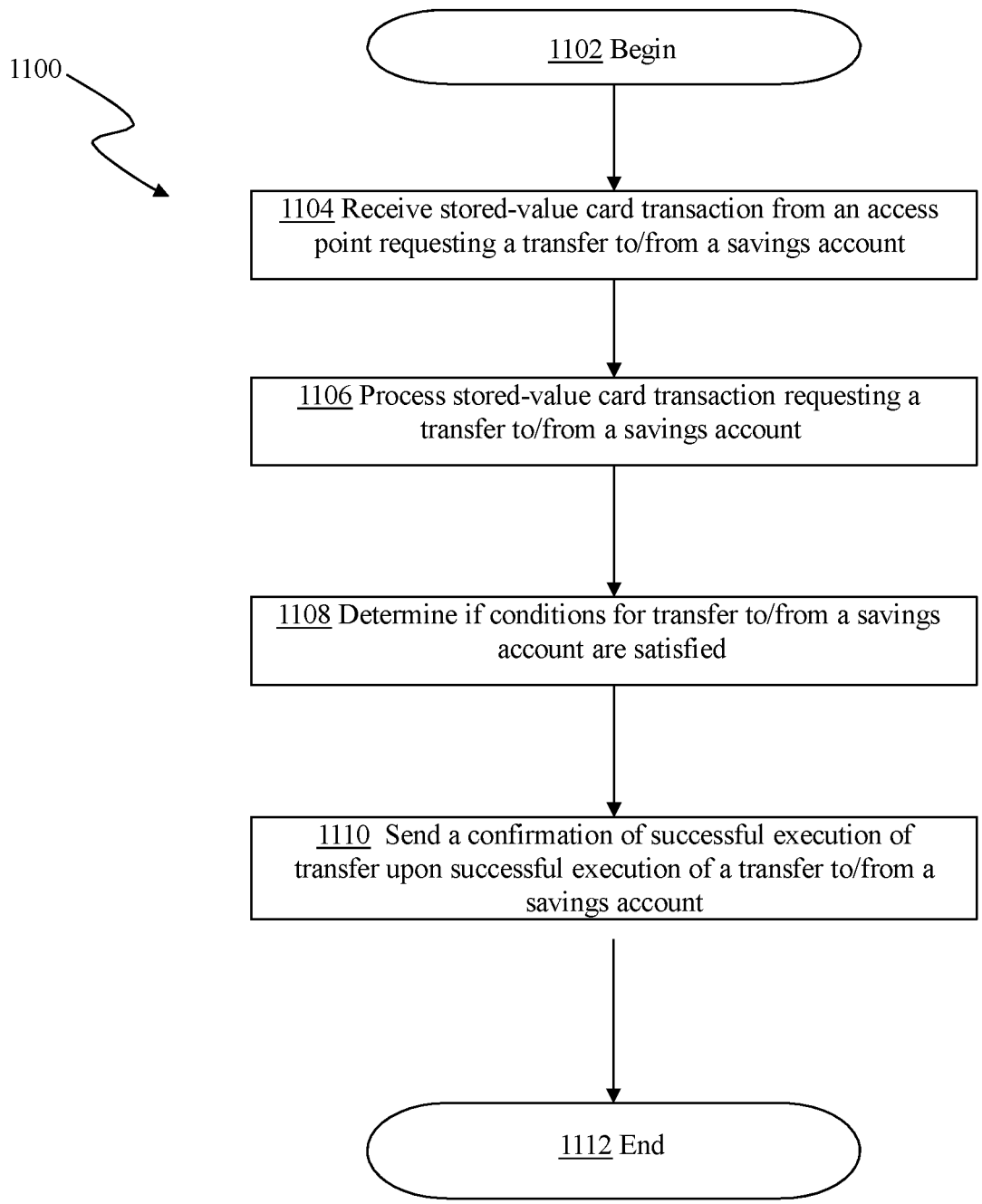
FIG. 11 illustrates a method of processing transfers between stored-value card primary and secondary accounts in accordance with at least some illustrated embodiments.

FIG. 11 illustrates a method 1100 beginning at 1102 and ending at 1112. At 1104, a stored-value card transaction request a transfer to or from a savings account is received via an access point. At 1106, an internal card processing service and/or savings transfer processing service processes a request to transfer to or from a savings account. At 1108, a determination is made that (a) the savings account is active and has a positive, nonzero balance; (b) the savings account has sufficient balance to process the transfer request; (c) the savings account has had 5 or less transfers out of the account during the calendar month; and (d) the primary account balance has not exceeded the maximum value as defined by the cardholder terms and conditions. A replenish request is generated based on the stored-value card activation request. Method 1100 may comprise a message modification service that interprets the results of the determination at 1108. For example, if the transfer request fails because the request is a seventh withdrawal of the calendar month, the transfer request may be denied. In at least one embodiment, the transfer request is executed. At 1110, a confirmation of successful execution of the transfer to/from a savings account is sent upon successful execution of the transfer request.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The ordering of steps in various processes, data flows, and flowcharts presented are for illustration purposes and do not necessarily reflect the order that various steps must be performed. The steps may be rearranged in different orders in different embodiments to reflect the needs, desires, and preferences of the entity implementing the systems. Furthermore, many steps many be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

It will be apparent to those skilled in the art that modifications may be made without departing from the spirit and scope of the disclosure. The embodiments described are representative only, and are not intended to be limiting. Many variations, combinations, and modifications of the applications disclosed herein are possible and are within the scope of the disclosure. Accordingly, the scope of protection is not limited by the description set out above, but is defined by the claims which follow, that scope including all equivalents of the subject matter of the claims.

Reference is made to the following specific embodiments:
1. A financial account system, comprising:
    a stored-value card;
    a first financial account directly accessible via the stored-value card;
    a second financial account associated with the first financial account, wherein funds may be transferred between the first financial account and the second financial account.
2. The financial account system of embodiment 1 wherein the funds maintained in the first financial account and the second financial account comprise a consumer's financial interest.
3. The financial account system, of embodiment 2 wherein the consumer may only withdraw funds from the first financial account.
4. The financial account system of embodiment 1 wherein balances associated with the first financial account and/or the second financial account may be used to collateralize loans.
5. The financial account system of embodiment 1 wherein balance limits of the first financial account and the second financial account are determined by a stored-value card issuer, financial account manager, sponsor bank, or combinations thereof.
6. The financial account system of embodiment 1 wherein transaction codes associated with the second financial account are configurable to correspond to bank, issuer, and/or manager desired parameters.
7. The financial account system of embodiment 1 wherein the first financial account and/or the second financial may remain open and viable regardless of any timing issues and/or balance amount values.
8. The financial account system of embodiment 1 further comprising service agents, wherein the service agents may have an ability to effectuate any transaction and/or request associated with the stored-value card, the first financial account, the second financial account, or combinations thereof.
9. The financial account system of embodiment 1 wherein transfers between the first financial account and the second financial account may be automatic, recurring, or one-time events and wherein the automatic, recurring, or one-time events may be transacted regardless of a current balance of the first financial account and/or the second financial account.
10. The financial account system of embodiment 1 wherein interest is paid on the first financial account and/or the second financial account at times designated by bank, issuer, and/or manager desired parameters.
11. The financial account system of embodiment 1 wherein any component of the system may be provided to a consumer as an individual and/or stand-alone feature.
12. The financial account system of embodiment 1 wherein a consumer may purchase and/or establish the stored-value card, the first financial account, the second financial account, or combinations thereof with an amount designated by a stored-value card issuer, financial account manager, sponsor bank, or combinations thereof.
13. The financial account system of embodiment 1 wherein any fees associated with the system are configurable to correspond to bank, issuer, and/or manager desired parameters.
14. The financial account system of embodiment 1 further comprising one or more additional financial accounts associated with the first financial account and/or the second financial account, wherein all financial accounts may be associated and funds may be transferred between financial accounts.
15. The financial account system of embodiment 14 wherein the funds maintained in the financial accounts comprise a consumer's financial interest.
16. The financial account system of embodiment 14 wherein balances associated with the financial accounts may be used to collateralize loans.
17. The financial account system of embodiment 14 wherein balance limits of the financial accounts are determined by a stored-value card issuer, financial account manager, sponsor bank, or combinations thereof.
18. The financial account system of embodiment 14 wherein transaction codes associated with the financial accounts are configurable to correspond to bank, issuer, and/or manager desired parameters.
19. The financial account system of embodiment 14 wherein the financial accounts may remain open and viable regardless of any timing issues and/or balance amount values.

20. The financial account system of embodiment 14 further comprising service agents, wherein the service agents may have an ability to effectuate any transaction and/or request associated with the stored-value card, the financial accounts, or combinations thereof.

21. The financial account system of embodiment 14 wherein transfers between the financial accounts may be automatic, recurring, or one-time events and wherein the automatic, recurring, or one-time events may be transacted regardless of a current balance of the financial accounts.

22. The financial account system of embodiment 14 wherein interest is paid on the financial accounts at times designated by bank, issuer, and/or manager desired parameters.

23. The financial account system of embodiment 14 wherein any component of the system may be provided to a consumer as an individual and/or stand-alone feature.

24. The financial account system of embodiment 14 wherein a consumer may purchase and/or establish the stored-value card, the financial accounts, or combinations thereof with an amount designated by a stored-value card issuer, financial account manager, sponsor bank, or combinations thereof.

25. The financial account system of embodiment 14 wherein any fees associated with the system are configurable to correspond to bank, issuer, and/or manager desired parameters.

What is claimed is:

1. A financial account system, comprising:
a linearly scalable grid computing network, wherein the linearly scalable grid network increases the efficiency, speed and reliability of the financial account system;
a memory grid, wherein the memory grid comprises a first data space used by real time processes and a second data space used by hatch processes;
a processor, wherein the processor executes executable instructions which cause the linearly scalable grid computing network to insert transaction data asynchronously into temporary data tables in the memory grid's data space for real time processes for faster access; a stored-value card;
a first financial account stored in the memory grid directly accessible via the stored-value card;
a second financial account stored in the memory grid and associated with the first financial account, wherein funds may be transferred between the first financial account and the second financial account; and
one or more additional financial accounts, wherein the one or more additional financial accounts are associated with the first financial account and/or the second financial account, wherein all financial accounts may be associated and hinds may be transferred between financial accounts, and wherein the financial accounts may remain open and viable regardless of any timing issues and/or balance amount values.

2. The financial account system of claim 1 wherein the funds maintained in the first, financial account and the second financial account comprise a consumer's financial interest.

3. The financial account system, of claim 2 wherein a consumer may only withdraw funds from the first financial account.

4. The financial account system of claim 1 wherein balances associated with the first financial account and/or the second financial account may be used to collateralize loans.

5. The financial account system of claim 1 wherein balance limits of the first financial account and the second financial account are determined by a stored-value card issuer, financial account manager, sponsor bank, or combinations thereof.

6. The financial account system of claim 1 wherein transaction codes associated with the second financial account are configurable to correspond to bank, issuer, and/or manager desired parameters.

7. The financial account system of claim 1 wherein the first financial account and/or the second financial account may remain open and viable regardless of any timing issues and/or balance amount values.

8. The financial account system of claim 1 wherein transfers between the first financial account and the second financial account may be automatic, recurring, or one-time events and wherein the automatic, recurring, or one-time events may be transacted regardless of a current balance of the first financial account and/or the second financial account.

9. The financial account system of claim 1 wherein interest is paid on the first financial account and/or the second financial account at times designated by bank, issuer, and/or manager desired parameters.

10. The financial account system of claim 1 wherein any component of the system may be provided to a consumer as an individual and/or stand-alone feature.

11. The financial account system of claim 1 wherein a consumer may purchase and/or establish the stored-value card, the first financial account, the second financial account, or combinations thereof with an amount designated by a stored-value card issuer, financial account manager, sponsor bank, or combinations thereof.

12. The financial account system of claim 1 wherein any fees associated with the system are configurable to correspond to bank, issuer, and/or manager desired parameters.

13. The financial account system of claim 1 wherein the funds maintained in the financial accounts comprise a consumer's financial interest.

14. The financial account system of claim 1 wherein balances associated with the financial accounts may be used to collateralize loans.

15. The financial account system of claim 1 wherein balance limits of the financial accounts are determined by a stored-value card issuer, financial account manager, sponsor bank, or combinations thereof.

16. The financial account system of claim 1 wherein transaction codes associated with the financial accounts are configurable to correspond to bank, issuer, and/or manager desired parameters.

17. The financial account system of claim 1 wherein transfers between the financial accounts may be automatic, recurring, or one-time events and wherein the automatic, recurring, or one-time events may be transacted regardless of a current balance of the financial accounts.

18. The financial account system of claim 1 wherein interest is paid on the financial accounts at times designated by bank, issuer, and/or manager desired parameters.

19. The financial account system of claim 1 wherein any component of the system may be provided to a consumer as an individual and/or stand-alone feature.

20. The financial account system of claim 1 wherein a consumer may purchase and/or establish the stored-value card, the financial accounts, or combinations thereof with an amount designated by a stored-value card issuer, financial account manager, sponsor bank, or combinations thereof.

21. The financial account system of claim 1 wherein any fees associated with the system are configurable to correspond to bank, issuer, and/or manager desired parameters.

\* \* \* \* \*